(12) United States Patent
Webb et al.

(10) Patent No.: US 10,715,867 B2
(45) Date of Patent: Jul. 14, 2020

(54) PROVIDING MEDIA CONTENT TO CONTENT CONSUMERS FOR PLAYBACK AND CONSUMPTION

(71) Applicant: Turner Broadcasting Systems, Inc., Atlanta, GA (US)

(72) Inventors: Nicolas Paul Webb, McDonough, GA (US); Nishith Kumar Sinha, Mableton, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 0 days.

(21) Appl. No.: 16/246,160

(22) Filed: Jan. 11, 2019

(65) Prior Publication Data
US 2019/0215564 A1    Jul. 11, 2019

Related U.S. Application Data

(60) Provisional application No. 62/616,216, filed on Jan. 11, 2018.

(51) Int. Cl.
*H04N 7/16* (2011.01)
*H04N 21/4627* (2011.01)
(Continued)

(52) U.S. Cl.
CPC ..... *H04N 21/4627* (2013.01); *G06F 16/1824* (2019.01); *G06F 21/105* (2013.01);
(Continued)

(58) Field of Classification Search
CPC .......... H04N 21/4627; H04N 21/2347; H04N 21/44222; H04N 21/4622; H04N 21/47202; H04N 21/8352; G06F 16/1824; G06F 21/105; G06F 21/64; H04L 9/0643; H04L 9/0825; H04L 9/0861; H04L 9/3236;
(Continued)

(56) References Cited

U.S. PATENT DOCUMENTS

| 8,639,625 | B1 * | 1/2014 | Ginter | G06F 21/10 |
| | | | | 705/50 |
| 2008/0092181 | A1 * | 4/2008 | Britt | H04N 7/1675 |
| | | | | 725/87 |

(Continued)

*Primary Examiner* — Mulugeta Mengesha
(74) *Attorney, Agent, or Firm* — Chip Law Group

(57) ABSTRACT

Media content items is provided to content consumers for playback and consumption includes plurality of nodes interacting with each other in accordance with defined protocol in communication network. A first node receives a request for playback of a media content from a content consumer. A second node owns the requested media content and provides media content rights to the first participant and/or the content consumer. The first node further provides media content metadata to the consumer device for consumption. A plurality of instances of a distributed media rights transaction ledger, associated with respective node, includes a plurality of media content rights transactions corresponding to an acquisition of the media content rights by the first participant and/or content consumer prior to the consumption of the media content. The plurality of media content rights transactions is categorized, defined, and managed by plurality of nodes in accordance with the defined protocol.

29 Claims, 7 Drawing Sheets

(51) Int. Cl.
- *H04N 21/8352* (2011.01)
- *H04L 29/06* (2006.01)
- *H04L 9/06* (2006.01)
- *G06F 16/182* (2019.01)
- *G06F 21/10* (2013.01)
- *G06F 21/64* (2013.01)
- *H04L 9/08* (2006.01)
- *H04L 9/32* (2006.01)
- *H04L 29/08* (2006.01)
- *H04N 21/2347* (2011.01)
- *H04N 21/442* (2011.01)
- *H04N 21/462* (2011.01)
- *H04N 21/472* (2011.01)

(52) U.S. Cl.
CPC ............ *G06F 21/64* (2013.01); *H04L 9/0643* (2013.01); *H04L 9/0825* (2013.01); *H04L 9/0861* (2013.01); *H04L 9/3236* (2013.01); *H04L 9/3247* (2013.01); *H04L 63/126* (2013.01); *H04L 67/10* (2013.01); *H04L 69/24* (2013.01); *H04N 21/2347* (2013.01); *H04N 21/44222* (2013.01); *H04N 21/4622* (2013.01); *H04N 21/47202* (2013.01); *H04N 21/8352* (2013.01); *H04L 2209/603* (2013.01); *H04L 2463/101* (2013.01)

(58) Field of Classification Search
CPC ..... H04L 9/3247; H04L 63/126; H04L 67/10; H04L 69/24
See application file for complete search history.

(56) References Cited

U.S. PATENT DOCUMENTS

2014/0165209 A1* 6/2014 Yin ..................... H04L 63/0823
726/26
2016/0321434 A1* 11/2016 McCoy ................ G06Q 30/018

* cited by examiner

PROVIDING MEDIA CONTENT TO CONTENT CONSUMERS FOR PLAYBACK AND CONSUMPTION

CROSS-REFERENCE TO RELATED APPLICATIONS/INCORPORATION BY REFERENCE

This patent application makes reference to, and claims priority to U.S. Application Ser. No. 62/616,216, filed on Jan. 11, 2018.

This application also makes reference to: U.S. application Ser. No. 16/245,374, filed on Jan. 11, 2019; and U.S. application Ser. No. 16/246,249, filed on Jan. 11, 2019.

The above-referenced patent application is hereby incorporated herein by reference in its entirety.

FIELD OF TECHNOLOGY

Certain embodiments of the disclosure relate to a media content rights management system for digital media and television content. More specifically, certain embodiments of the disclosure relate to providing media content items to content consumers for playback and consumption.

BACKGROUND

Advancements in the field of digital media industry, digital media content rights management, and television and broadcasting sector have led to development of various technologies and broadcasting platforms that are revolutionizing the way consumer devices access and consume media content. Usually, broadcasting platforms refer to the types of networks that are used to deliver the media content to the consumers. Currently, all the broadcasting platforms, such as analog terrestrial broadcast, digital terrestrial broadcast, direct-to-home satellite broadcast, cable, Internet Protocol (IP), and over-the-top television (OTT), compete and strive to increase their appeal in order to gain wider audience.

The television viewing market is no longer exclusively concerned with whether media content services are viewed on a dedicated television or another device capable of playing media content. As a result of penetration of new technologies in the television and broadcasting sector, it is evident that the future success of television broadcasting will be dependent on the ability of a network provider to simplify access to the content that consumers demand.

Increased competition has led the broadcast providers, the media content owners, and the media content re-distributors to handle multiple channels, associated media content rights, and modes of delivery at the same time, which in turn have added unparalleled levels of complexity. This requires installation of large infrastructures and resources to maintain uninterrupted content delivery for existing channel and also meet the ever-increasing demand of new channels.

Currently, clearance and negotiations of media content rights are very time consuming and backed by readily inaccessible/unusable data. Further, multiple content libraries by various entities, require separate subscriptions and make it difficult for users to navigate to content of their choice freely without having individual subscription. From content consumer's perspective, there are multiple content libraries available from different service providers that are increasing in number day-by-day, thereby making it difficult for the content consumers to add and manage different subscriptions to consume the content of their choice. Furthermore, third-party measurement of viewership of a media content may be costly, myopic, and often not available for all platforms. There is no mechanism to precisely track media content rights and royalties for various entities. Further, isolated media content catalogs and third-party dependencies to estimate viewership for a media content, such as a TV show, to plan for future advertisement inventory needs and obligations, increase complexities. This in turn increases re-work and requires installation of large infrastructures and resources to maintain uninterrupted media content delivery for existing channels and limits the ability of the broadcaster or distributor to change content and/or provide digital rights management (DRM) licenses for desired media content in real time or near-real time.

Thus, a new and advanced ecosystem may be desirable where all the stakeholders, such as the content owners, the content distributors and re-distributors, gateways, and the end consumers, can functionally interact with each other quickly and securely for acquisition, re-distribution, enforcement, and overall tracking of content rights and DRM licenses to provide simplified and customized playback and consumption of media content.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for providing media content items to content consumers for playback and consumption, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
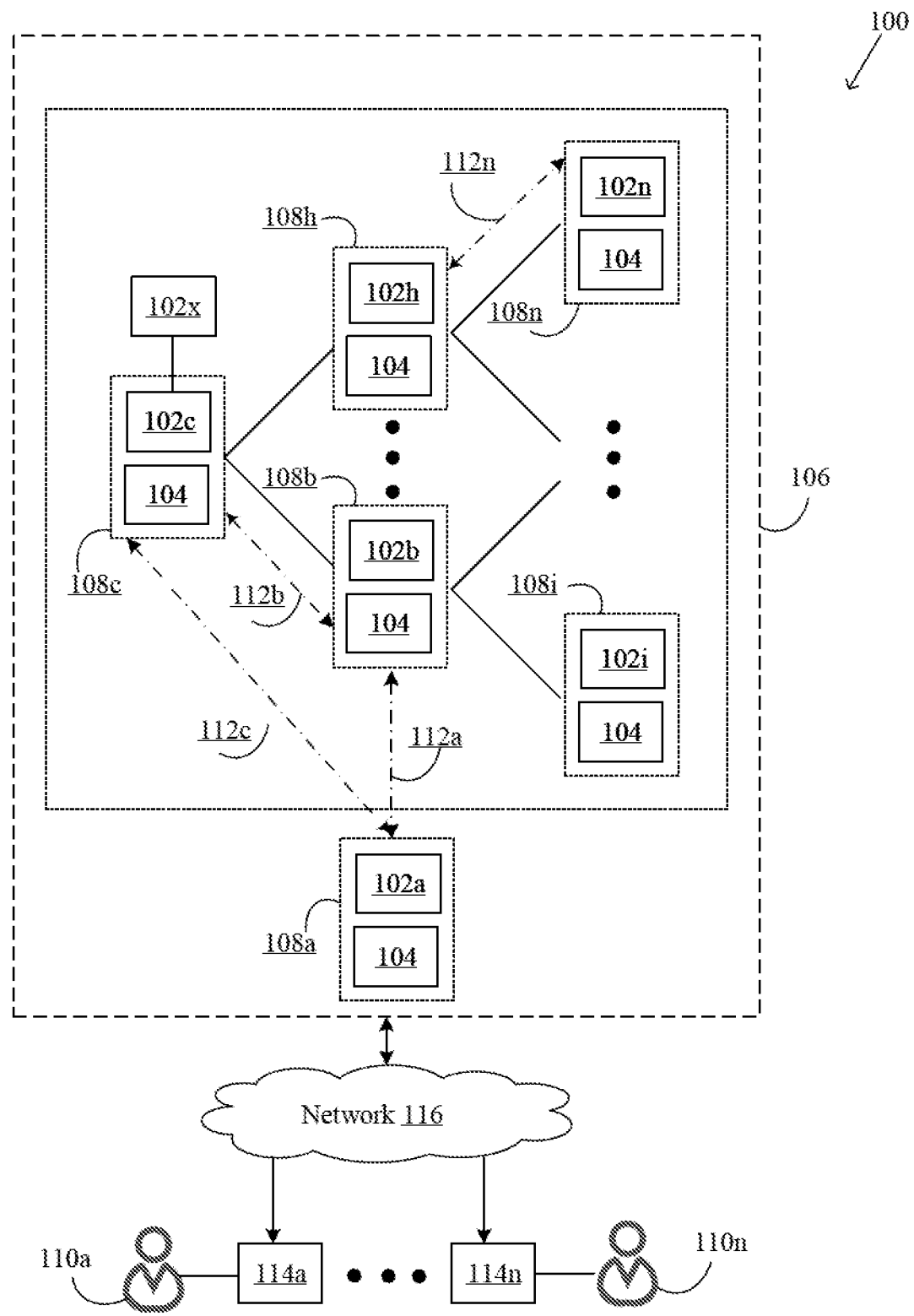
FIG. 1A is a block diagram that illustrates an exemplary system for providing media content items to content consumers for playback and consumption, in accordance with an exemplary embodiment of the disclosure.

Certain embodiments of the disclosure may be found in a method and system for providing media content items to content consumers for playback and consumption. Various embodiments of the disclosure provide a method and system that simplifies and secures the acquisition, re-distribution, enforcement, and tracking of media content rights and DRM licenses to provide simplified and customized playback and consumption of media content using a distributed media rights transaction ledger in a cost-effective and seamless manner. Various embodiments of the disclosure provide a mechanism by which the participants, such as the content owners, distributors, and the content consumers, may functionally interact with each other seamlessly and securely to enable simplified, unified, and customized access to the media content that content consumers demand, and also enable acquisition of DRM-managed media licenses. The disclosed method and system further provide dynamic and on-the-fly negotiation of media content rights, contractual obligations, and preparation of custom catalogs to provide new and customized media asset offerings in cost-effective manner and enhanced viewer experience to reinvigorate the digital media and television content broadcasting industry.

In accordance with various embodiments of the disclosure, a system is provided for providing media content items to content consumers for playback and consumption. In an embodiment, the system may comprise a plurality of nodes configured to interact with each other in accordance with a defined protocol in a communication network. A first node of the plurality of nodes associated with a first participant may be configured to receive a request for playback of a media content from a content consumer associated with a consumer device. A second node of the plurality of nodes may be associated with a second participant, which owns the requested media content. The second participant may be configured to provide media content rights associated with the requested media content to the first participant and/or the content consumer. The first node may be further configured to provide a media content metadata to the consumer device for consumption by the consumer device. A plurality of instances of the distributed media rights transaction ledger may be associated with a respective node of the plurality of the nodes. The media content metadata may be received from an instance of the plurality of instances of the distributed media rights transaction ledger. Each instance of the distributed media rights transaction ledger may include a plurality of media content rights transactions corresponding to at least an acquisition of the media content rights by the first participant $108a$ and/or first content consumer prior to the consumption of the media content at the consumer device. The plurality of media content rights transactions may be categorized and defined based on the defined protocol. The plurality of media content rights transactions may be managed by the plurality of nodes in accordance with the defined protocol in the communication network.

Figure 1B:
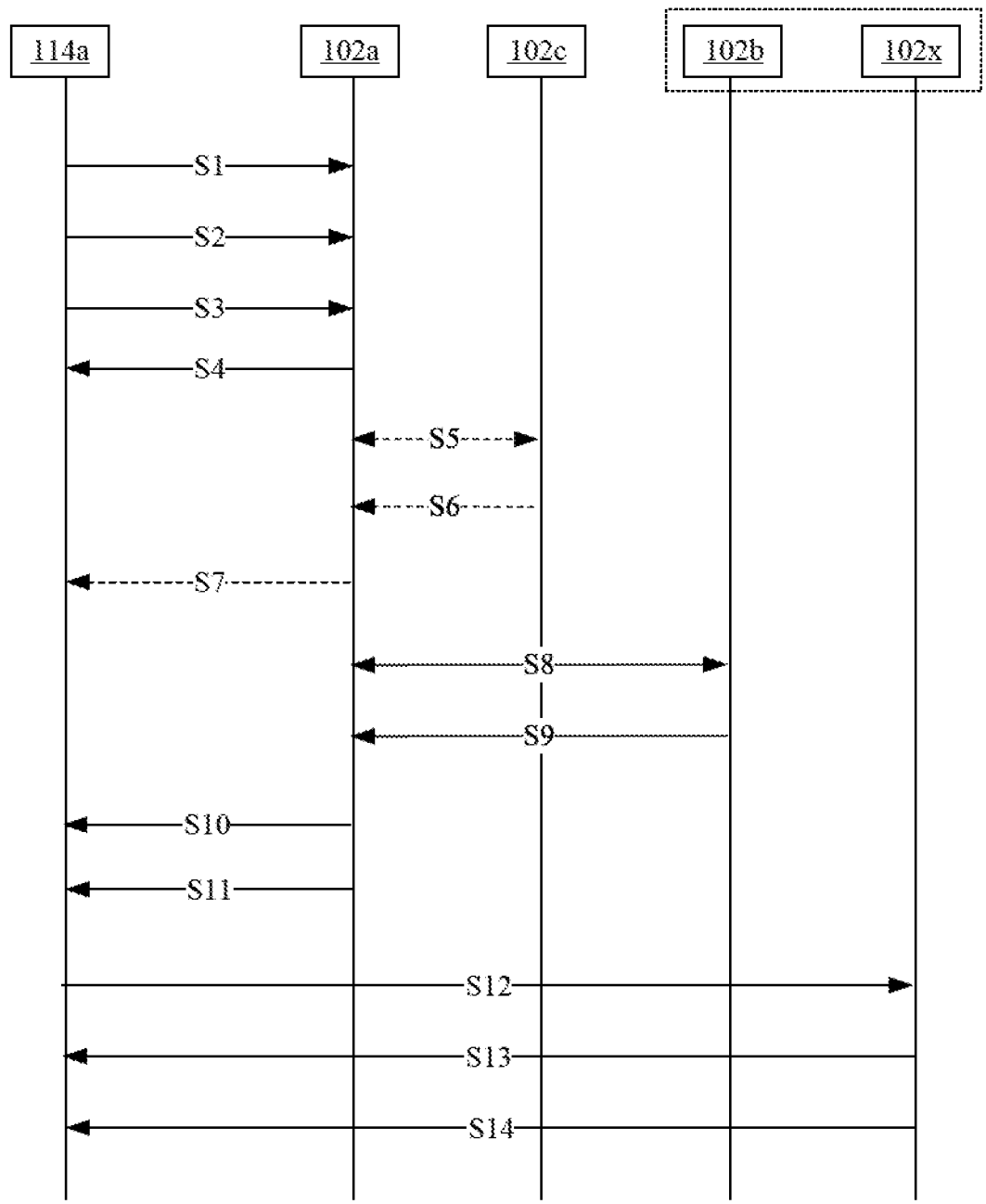
FIG. 1B depicts a message flow diagram illustrating exemplary message flows for providing media content items to content consumers for playback and consumption in the ecosystem 100 of FIG. 1A, in accordance with an exemplary embodiment of the disclosure.

FIG. 1A is a block diagram that illustrates an exemplary system for providing media content items to content consumers for playback and consumption, in accordance with an exemplary embodiment of the disclosure. Further, FIG. 1B depicts a message flow diagram illustrating exemplary message flows for providing media content items to content consumers for playback and consumption in the ecosystem $100$ of FIG. 1A, in accordance with an exemplary embodiment of the disclosure. FIG. 1A is described herein in conjunction with FIG. 1B, in accordance with an exemplary embodiment of the disclosure.

Referring to FIG. 1A, there is shown a network of nodes and participants, hereinafter "ecosystem $100$", for dynamic management of media content rights, in accordance with an exemplary embodiment of the disclosure. The ecosystem $100$ may comprise a plurality of nodes $102a, \ldots, 102z$ that are communicatively coupled to each other. There is shown a distributed media rights transaction ledger $104$ that remain distributed and synchronized with the plurality of nodes $102a, \ldots, 102z$, in a communication network $106$. There is further shown a plurality of participants $108a, \ldots, 108n$ and $110a, \ldots, 110n$, that may be associated with corresponding nodes from the plurality of nodes $102a, \ldots, 102z$. One or more nodes from the plurality of nodes $102a, \ldots, 102z$ may be configured to manage a plurality of media content rights transactions $112a, \ldots, 112n$ with one or more remaining nodes of the plurality of nodes $102a, \ldots, 102z$. The plurality of participants $108a, \ldots, 108n$ and $110a, \ldots, 110n$ include a plurality of entities $108a, \ldots, 108n$ and a plurality of content consumers $110a, \ldots, 110n$. There is further shown a plurality of consumer devices $114a, \ldots, 114n$ associated with respective content consumers of the plurality of content consumers $110a, \ldots, 110n$. The communication network $106$ may be communicatively coupled to the plurality of content consumers $110a, \ldots, 110n$ via a network $116$.

Although for brevity, there is shown one third node $102c$ which is integrated with one fourth node $102x$ in the exemplary FIG. 1A; however, it should not be construed to be limiting and multiple instances of the third node $102c$ integrated with corresponding instances of the fourth node $102x$ may exist in the ecosystem $100$ without any deviation from the scope of the disclosure.

The ecosystem $100$ may provide an online platform for creation of a digital marketplace where new media markets, such as a content trading markets, may emerge. Such a digital marketplace for media content rights may then be realized based on a defined protocol or a method which defines a standard for the plurality of nodes $102a, \ldots, 102z$ to communicatively couple and interact with each other. The defined protocol may be configured to establish a network of the plurality of nodes $102a, \ldots, 102z$, and the plurality of participants $108a, \ldots, 108n$ and $110a, \ldots, 110n$ upon which media content rights may be acquired, redistributed, constraints enforced, transferred or consumed. Among the plurality of participants $108a, \ldots, 108n$ and $110a, \ldots, 110n$ of the ecosystem $100$, a simplified, secured, real-time, and fail-safe tracking of the media content rights is ensured. In accordance with an embodiment, a media content right associated with a media content may be an electronic implementation of a legal contract designed to allow only authorized redistribution of the digital media content and restrict the ways the media content is consumed.

The plurality of nodes $102a, \ldots, 102z$ may correspond to a server or a service that may be configured to execute an implementation of the defined protocol for joining the communication network $106$. In accordance with some embodiments, a node of the plurality of nodes $102a, \ldots, 102z$ may be a software application that includes a set of instructions for defining rules for the programmatic implementation of the defined protocol. In accordance with other embodiments, a node of the plurality of nodes $102a, \ldots, 102z$ may be a hardware device in which the software application is executed. The hardware device may be owned by an entity, for example, a content owner or a content distributor. The plurality of nodes 102a, ..., 102z may be further configured to maintain a copy of the distributed media rights transaction ledger 104 and may create, distribute, execute, and validate media content rights transactions on/from the communication network 106. In accordance with an embodiment, each node of the plurality of nodes 102a, ..., 102z may be further configured to maintain a corresponding instance of the distributed media rights transaction ledger 104 and communicate the corresponding instance of the distributed media rights transaction ledger 104 to the one or more remaining nodes upon request.

At least one node of the plurality of nodes 102a, ..., 102z, such as a second node 102b, a third node 102c, a verifier node 102n, or the fourth node 102x may be configured to verify the one or more media content rights transactions of the plurality of media content rights transactions 112a, ..., 112n communicated by the one or more remaining nodes of the plurality of nodes 102a, ..., 102z. In accordance with an embodiment, the verification may be based on verifying the identity and signature of the sender entity, such as the first entity associated with a first node 102a.

In accordance with an embodiment, the at least one node of the plurality of nodes 102a, ..., 102z, such as the second node 102b, the third node 102c, the verifier node 102n, or the fourth node 102x may be further configured to reject a set of invalid media content rights transactions from the one or more media content rights transactions. In accordance with an embodiment, the rejection may be based on the unverified identity and signature of the sender entity, such as the first entity associated with the first node 102a. and create new media content rights transactions on behalf of at least one of a content consumer, content distributor, or content owner. The new media content rights transactions may be communicated to the one or more remaining nodes of the plurality of nodes 102a, ..., 102z.

In accordance with an embodiment, negotiations for media content rights for media content, for example a media asset, between two or more entities, such as a content distributor or a content owner, include media content rights transactions. Each entity dictates corresponding terms of agreement for the media content. The media content rights transactions may occur in sequence, forming a sequence of events. In some embodiments, the negotiations for the media content rights may occur in the communication network 106, where each media content rights transaction may be broadcasted to the entire communication network 106 (i.e., to all the nodes of the plurality of nodes 102a, ..., 102n in the communication network 106). In other embodiments, the negotiations for the media content rights may be done mutually, where two or more nodes respective to each entity may communicate by issuing transactions directly to one another instead of broadcasting media content rights transactions to the entire communication network 106. In this regard, one or more media content rights transactions may be private transactions between two entities for which private channels may be created to communicate via nodes of the plurality of nodes 102a, ..., 102z associated with different participants. This type of media content rights transaction may form a sister collection of media content rights transactions between the two entities. This may prevent excess traffic (distribution and validation of transactions) on the communication network 106 (of other nodes outside of the negotiation) and frees up other nodes to handle core traffic. However, every set of such mutual negotiations ends with one media content rights transaction on the distributed media rights transaction ledger 104 that dictates a contract between two or more entities over media content rights to agreed media content, such as one or more media assets, which may include some or all of the data referenced in the private transactions in a clear or encrypted form.

In accordance with an embodiment, at least one node of the plurality of nodes 102a, ..., 102z may be further configured to determine (or discover) one or more new nodes which joined the communication network 106 within a defined time period, and communicate information associated with the plurality of nodes 102a, ..., 102n to the one or more new nodes. Thus, each node may be further configured to communicate media content rights transactions to other nodes, regardless of whether the media content rights transactions originate with the node or were communicated to it by other nodes. This way, any given media content rights transaction may be disseminated to all nodes on the communication network 106. The at least one node of the plurality of nodes 102a, ..., 102z may be further configured to enforce an adherence of the plurality of nodes 102a, ..., 102z to the protocol by refusing or accepting to communicate with the plurality of nodes 102a, ..., 102z.

In accordance with an embodiment, a node, such as the first node 102a, of the plurality of nodes 102a, ..., 102z may be configured to act as an electronic gateway or a proxy for a consumer device associated with a content consumer to connect with at least one node of the plurality of nodes 102a, ..., 102z. In this regard, the node is accessible to consumer devices via an application programming interface (API) which allows the content consumers to interact with the communication network 106. The first node 102a, such as a gateway, that belongs to an entity acting on behalf of the content consumer, may acquire media content rights and gather metadata surrounding available media content. The purpose of a node proxying a content consumer, such as one of the plurality of content consumers 110a, ..., 110n, to the communication network 106 is to allow rapid scaling of the number of content consumers without the need to scale the count of nodes.

Such node of the plurality of nodes 102a, ..., 102z may be further configured to determine an identity of the content consumer from credentials of the content consumer. In accordance with an embodiment, the identity may be derived from a globally unique cryptographic identifier associated with the content consumer. The node may be further configured to determine that the content consumer exists in an alternate data store that is created based on at least a corresponding instance of the distributed media rights transaction ledger 104. The alternate data store may include a set of transactions of the plurality of media content rights transactions 112a, ..., 112n that correspond to records of a plurality of content consumers that joins the communication network as new content consumers. The node may be configured to validate the content consumer based on the existence of the identity of the content consumer in the alternate data store.

In accordance with an embodiment, at least one node may be further configured to enforce a plurality of constraints associated with the one or more media content rights defined in at least one transaction of the plurality of media content rights transactions 112a, ..., 112n for a participant to acquire, distribute, or consume content associated with the one or more media content rights. In accordance with an embodiment, each node may represent at least one participant on the communication network 106 based on signed transactions originated from the node with a cryptographic signature of corresponding participant.

In accordance with an embodiment, a node of the plurality of nodes 102a, . . . , 102z may be responsible and configured to communicate corresponding instance of the distributed media rights transaction ledger 104, to other requesting nodes in the communication network 106. Accordingly, a new node may be configured to share the same distributed media rights transaction ledger history with any/all other nodes as well, which allows auditing an instance of the distributed media rights transaction ledger associated with a corresponding node. In other words, each node may append corresponding media content rights transactions, as well as media content rights transactions from other nodes in its own instance of the distributed media rights transaction ledger 104.

The distributed media rights transaction ledger 104 may correspond to a consensus of replicated, shared, and synchronized digital data, for example the plurality of media content rights transactions 112a, . . . , 112n, geographically spread across multiple sites, countries, or institutions. The distributed media rights transaction ledger 104 has no central administrator or centralized data storage. Data integrity in the distributed media rights transaction ledger 104 may be secured by consensus across the sites in addition to cryptographic techniques.

In accordance with an embodiment, each instance of the distributed media rights transaction ledger 104 may include a plurality of media content rights transactions 112a . . . , 112n corresponding to at least an acquisition of the media content rights by the first participant 108a and/or a content consumer, for example the first content consumer 110a, prior to the consumption of the media content at the first consumer device 114a.

In accordance with an embodiment, the distributed media rights transaction ledger 104 may include records of historical interactions in a time sequence related to flow or movement of media content rights from a content owner to a content distributor, or from a content distributor to another content distributor, or from a content owner or a content distributor to a content consumer in any arbitrary media content right transaction. In some embodiments, in addition to media content rights, the distributed media rights transaction ledger 104 may include historical records of interactions in a time sequence of media consumption by content consumer and related data/analytics, content catalog information, and the like.

The communication network 106 may correspond to a collection of nodes, such as the plurality of nodes 102a, . . . , 102z, that interact with one another, perform broadcast media content rights transactions with respect to one another, and maintain a copy of the distributed media rights transaction ledger 104 to act as a common store of data. In accordance with various embodiment, the communication network 106 may be a peer-to peer network, a protocol network, a distributed communication network and/or the like. In accordance with other embodiments, the communication network 106 may comprise one or more of a cable television networks, the Internet, a satellite communication network, a wide area network (WAN), a medium area network (MAN), and a local area network (LAN). Although a communication network 106 is shown in FIG. 1A, the disclosure is not limited in this regard; accordingly, other exemplary modes may comprise uni-directional or bi-directional distribution, such as packet-radio or satellite communication.

The plurality of participants 108a, . . . , 108n and 110a, . . . , 110n, may correspond to a group, a collective entity, an individual, or a company that may operate the plurality of nodes 102a, . . . , 102z on the communication network 106. A participant of the plurality of participants 108a, . . . , 108n and 110a, . . . , 110n, may act as an entity of a plurality of entities 108a, . . . , 108n or a content consumer of a plurality of content consumers 110a, . . . , 110n. Each participant of the plurality of participants 108a, . . . , 108n and 110a, . . . , 110n may interact within the communication network 106 by operating at least one node that adheres to the defined protocol within the communication network 106.

Each entity of the plurality of entities 108a, . . . , 108n may be configured to interact with the communication network 106 by operating at least one node on the communication network 106 which adheres to the defined protocol. An entity associated with a node of the plurality of nodes 102a, . . . , 102n may present metadata of a plurality of content libraries as a unified library. Another entity of the plurality of entities 108a, . . . , 108n may represent a content owner, a content distributor, or both. From the content owner, one or more media content rights associated with media content may be originated. The content owners may be responsible for issuing licenses for consumption of the media content by the content consumers. All media content, such as the media assets, may have only one content owner in perpetuity. Media content rights to the media content, such as the media assets, may be acquired, and re-distributed in accordance with the permission of the content owner.

A content distributor of the plurality of entities 108a, . . . , 108n may acquire media content rights from another content owner or another content distributor and redistribute the acquired media content rights to other content distributors and gateway nodes. In accordance with an embodiment, the content owner may own a given collection of media content rights to be sold and/or distributed to content distributors and/or content consumers. When a content consumer is interacting with the communication network 106 through a node, which belongs to a given entity in the communication network 106, the content consumer may be considered to be owned by the given entity. Accordingly, the communication network 106 may be secured by ensuring that: a) content consumer transactions adhere to the protocol as enforced by the proxying/gateway node; b) the entity assumes responsibility over transactions requested by the content consumer; and c) another entity may request to validate the identity of a given user from a prior content owner using the distributed media rights transaction ledger 104. An example of validating an identity of a given content consumer is described in FIG. 4.

On the other hand, the content consumer of the plurality of content consumers 110a, . . . , 110n may be a user or an individual who may acquire media content rights via a gateway on the communication network 106. Accordingly, the content consumer may execute media content rights to acquire media content licenses to consume the media content. The content consumer may not have the ability to redistribute the acquired media content right. In accordance with an embodiment, the content consumer may require an entity (one of the content owner or the content distributor) as a proxy or a gateway to interact with the ecosystem 100 on behalf of the content consumer. Therefore, the content consumer may not be configured to operate any node of the plurality of nodes 102a, . . . , 102z. The content consumer of the plurality of content consumers 110a, . . . , 110n may be associated with a corresponding consumer device of the plurality of consumer devices 114a, . . . , 114n. A given content consumer may be unique across the entire communication network 106, regardless of which entities the content consumer interacts with or belongs to, based, for example, on a subscription or membership.

In accordance with an embodiment, an entity, as a content owner and/or a content distributor, may serve as a gateway for the plurality of content consumers 110a, . . . , 110n and act on the behalf of the plurality of content consumers 110a, . . . , 110n. Further, the entity may acquire the media content rights to distribute the media content that it does not own to other content distributors and/or content consumers. In such a case, the entity may act on the behalf of the plurality of content consumers 110a, . . . , 110n. In this regard, when a content consumer is proxied through an entity to the communication network 106, the entity may become an owner of the content consumer.

The plurality of media content rights transactions 112a, . . . , 112n make up the core unit (or building block) of data that may be recorded into the distributed media rights transaction ledger 104 of the communication network 106. Each media content rights transaction of the plurality of media content rights transactions 112a, . . . , 112n may act as a container for exchange of data across nodes among the plurality of nodes 102a, . . . , 102n. The structure of each media content rights transaction and corresponding data payload may be specified by the defined protocol for a given context, such that the plurality of nodes 102a, . . . , 102n in the communication network 106 may accept, reject, validate, and parse the plurality of media content rights transactions 112a, . . . , 112n in a deterministic and non-ambiguous manner.

Each media content rights transaction of the plurality of media content rights transactions 112a, . . . , 112n may be created by a node of the plurality of nodes 102a, . . . , 102z, and recorded into corresponding instance of the distributed media rights transaction ledger 104. Further, media content rights transaction of the plurality of media content rights transactions 112a, . . . , 112n may be communicated to other nodes to be rejected and dismissed or validated and recorded into corresponding instances of the distributed media rights transaction ledger 104 maintained at respective nodes of the plurality of nodes 102a, . . . , 102z. The data traffic created by the plurality of media content rights transactions 112a, . . . , 112n between the nodes of the plurality of nodes 102a, . . . , 102z is what defines the ecosystem 100 or the marketplace of media content rights. Each of the plurality of media content rights transactions 112a, . . . , 112n may be categorized and specified by the defined protocol. Each media content right transaction may include the category of: a) an announcement of a newly created entity; b) an announcement of a newly created content consumer; c) an announcement of newly available media content, such as a media asset; d) an acquisition of media content rights to media content (as a result of negotiations); and e) consumption of the media content by a content consumer.

In accordance with various embodiments, each of the plurality of media content rights transactions 112a, . . . , 112n may be configured to define the acquisition and execution of media content rights. Each of the plurality of media content rights transactions 112a, . . . , 112n may be stored in the distributed media rights transaction ledger 104 to serve as a history of interactions between various entities. Each of the plurality of media content rights transactions 112a, . . . , 112n must be originated from a node of the plurality of nodes 102a, . . . , 102n, and must be distributed to all nodes within the communication network 106 for validation and synchronization. Each of the plurality of media content rights transactions 112a, . . . , 112n may comprise at least one of an originating node's entity's cryptographic signature, a recipient entity's cryptographic identity, and identity of one or more media content rights for a given media content, negotiated terms of one or more media content rights, an identity of a content consumer, and disparate data associated with consumption of media content by a content consumer. Each of the plurality of media content rights transactions 112a, . . . , 112n may further comprise an encrypted summary of a set of media content rights transactions, one or more cryptographic hashes of historic media content rights transactions from the distributed media rights transaction ledger 104 for linking one media content rights transaction to another, and a cryptographic hash of all data comprising the media content rights transaction. Each of the plurality of media content rights transactions 112a, . . . , 112n may further comprise a descriptor for the intent of the media content rights transaction, which may further include at least granted media content rights after a negotiation, transferal of a media content right, and intent to begin a negotiation with another entity, grant of a media content right, consumption of media content by a content consumer, and registration of the plurality of participants 108a, . . . , 108n, and 110a, . . . , 110n.

In accordance with an embodiment, in a case where a media content rights transaction is found to be invalid by most nodes in the communication network 106, the media content rights transaction may be discarded and not appended to the distributed media rights transaction ledger 104 across all nodes of the plurality of nodes 102a, . . . , 102n. There may be an exception, where such invalid media content right transactions may be added to the distributed media rights transaction ledger 104, but remain invalid, to serve as a history of the origin of invalid media content rights transactions. Such a history may serve as a mechanism to audit potential attacks on the communication network 106 during auditing.

The network 116 may be any kind of network, or a combination of various networks, and it is shown illustrating the communication that may occur between the plurality of consumer devices 114a, . . . , 114n and the distributed communication network 106. For example, the communication network 106 may comprise one or more of a cable television networks, the Internet, a satellite communication network, a wide area network (WAN), a medium area network (MAN), and a local area network (LAN). Although the network 116 is shown, the disclosure is not limited in this regard, accordingly, other exemplary modes may comprise uni-directional or bi-directional distribution, such as packet-radio, satellite.

In operation, a node, such as the first node 102a, of the plurality of nodes 102a, . . . , 102z may be configured to receive login credentials, such as a username and a password, from the plurality of content consumers 110a, . . . , 110n, as depicted by S1 in FIG. 1B. The login credentials may be received from the plurality of content consumers 110a, . . . , 110n via respective consumer devices, such as the plurality of consumer devices 114a, . . . , 114n. The first node 102a may be configured to derive a unique cryptographic identifier, such as a unique string of alphanumeric characters of defined length, from the login credentials of each of the plurality of content consumers 110a, . . . , 110n. The unique cryptographic identifier may be derived based on, for example a hashing algorithm, defined in the protocol defined in the communication network 106, and may be stored in the alternate data store owned by the first node 102a.

In accordance with an embodiment, at a later time, when the first content consumer 110a requests a desired media content for consumption, by providing corresponding login credentials, the first node 102a, for example a streaming media and VOD service provider, may be configured to determine whether the unique cryptographic identifier of the first content consumer 110a is found in the alternate data store associated with the first node 102a. If not found, a validator system, for example another entity representing a direct broadcast satellite service provider, may be checked based on the distributed media rights transaction ledger 104. In accordance with an embodiment, a validator may be found for the unique cryptographic identifier of the first content consumer 110a using the distributed media rights transaction ledger 104. The validator may be found in case the validator system may have previously interacted with the first content consumer 110a, and corresponding content media rights transaction is stored in the distributed media rights transaction ledger 104. In an embodiment, the validator is not found for the unique cryptographic identifier of the first content consumer 110a using the distributed media rights transaction ledger 104, the first content consumer 110a may be invalidated.

In accordance with another embodiment, the first node 102a may be configured to validate the first content consumer 110a based on the existence of the unique cryptographic identifier of the first content consumer 110a in the alternate data store of the first node 102a. Additionally, the presence of the validator may validate the first content consumer 110a. Accordingly, the first node 102a may be configured to receive media content playback request, corresponding to media content selection, from the first content consumer 110a, via the first consumer device 114a, as depicted by S2 in FIG. 1B.

In accordance with an embodiment, the unified library/custom catalog 214b owned by the first node 102a may identify, prepare and present media content on-the-fly specifically for the first content consumer 110a, based on consumer behavior and consumption pattern of the first content consumer 110a, for playback. In accordance with an embodiment, the first content consumer 110a may provide a selection of a new media content, as depicted by S3 in FIG. 1B, which may or may not be present by the unified library/custom catalog 214b.

In accordance with an embodiment, the first node 102a may determine whether the media content rights (associated with selected media content) are available in the unified library/custom catalog 214b owned by the first node 102a. In this regard, it may be determined whether the first content consumer 110a or the first entity associated with the first node 102a has been granted the media content rights associated with the selected media content in the unified library/custom catalog 214b owned by the first node 102a. In case the media content rights associated with the selected media content are available at the first node 102a, the media content may be selected for consumption/execution of the rights from the unified library/custom catalog 214b and provided to the first content consumer 110a by the first node 102a, as depicted by S4 in FIG. 1B.

In case the first content consumer 110a or the first entity associated with the first node 102a has not been granted the media content rights associated with the selected media content in the unified library/custom catalog 214b, the first node 102a may determine whether the media content rights (associated with selected media content) are available for acquisition with the second entity associated with the second node 102b or the third entity associated with the third node 102c.

In accordance with an embodiment, the first node 102a may be configured to dynamically acquire the media content rights from the third entity associated with a third node 102c (that may redistribute the media content rights to the first content consumer 110a), as depicted by S6 in FIG. 1B. The first node 102a may acquire the media content rights from the third entity by negotiating with the third entity associated with the third node 102c (that has the media content rights available for redistribution), as depicted by S5 in FIG. 1B.

In accordance with another embodiment, the first node 102a may be configured to acquire the media content rights from the second entity associated with the second node 102b (that may own the media content and may directly provide the media content rights) as depicted by S9 in FIG. 1B. The first node 102a may acquire the media content rights from the second entity by negotiating with the second entity associated with the second node 102b (that owns the media content and associated media content rights), as depicted by S8 in FIG. 1B.

Accordingly, the first entity associated with the first node 102a may be configured to negotiate with the second entity associated with the second node 102b, as depicted by S8 in FIG. 1B, or the third entity associated with the third node 102c, as depicted by S5 in FIG. 1B. The negotiation may be performed for acquisition of the media content rights, as depicted by S5 or S8 in FIG. 1B, and based on a plurality of interactions between nodes from plurality of nodes 102a, . . . , 102z, in accordance with defined protocol in the communication network 106. The plurality of interactions between nodes from plurality of nodes 102a, . . . , 102z may result in the plurality of media content rights transactions 112a, . . . , 112n that may be stored in corresponding instances of the distributed media rights transaction ledger 104 maintained by each node of the plurality of nodes 102a, . . . , 102n within the communication network 106 for validation and synchronization.

In accordance with an embodiment, each node may cryptographically hash transaction data of each transaction. This hash may then be digitally signed by the media content rights transaction creator with a private key of a private key—public key pair. The public key may then be shared with other nodes whereas the private key is kept as a secret. This allows a node to verify the creator (or the initiator) of the media content rights transaction, and that the media content rights transaction data is not altered according to the hash digitally signed by the creator. Every single media content rights transaction is verified by checking the distributed media rights transaction ledger 104 distributed at the plurality of nodes 102a, . . . , 102n. Recent validated media content rights transactions may be grouped and cryptographically identified using, for example, but not limited to a hashing algorithm, defined by the protocol. Each group may have a unique cryptographic identifier which is derived from a previous group's final cryptographic identifier, transaction data's cryptographic identifier, and a defined mathematical value. The rules of the protocol may be defined in the genesis group, i.e. the first group. Given the different types of the media content rights transactions, nodes may be configured to derive certain data representing a marketplace, such as the ecosystem 100. The data that is derivable by each node of the plurality of nodes 102a, . . . , 102z may include a global catalog of available content items, a per-entity catalog or an entity level catalogs of available content (based on ownership/distribution rights), and a global user consumption of content items. Such data may create the possibility of inferring the value of media content items based on its demand (user consumption) and its supply (availability versus number of content distributors). An entity may then choose to invoke a negotiation with another entity, or entities, to acquire or distribute the media content rights to a media content item. Since the defined protocol dictates the method in which two or more entities may negotiate, negotiations may then occur dynamically and without premeditated action on behalf of any participating entities in the communication network 106.

Once the negotiation is successful, the first node 102a may be configured to provide the media content rights acquired from the second node 102b or the third node 102c to the first consumer device 114a, as depicted by S7 or S10 in FIG. 1B. In accordance with an embodiment, the media player of the first consumer device 114a may be provided a link for the media content from the media content master repository 222 of the second entity associated with the second node 102b to start viewing the media content based on the dynamically acquired rights.

Upon acquisition of media content rights from the second participant 108b for consumption of media content item at the first consumer device 114a, the first node 102a may be configured to transmit the media content item metadata to the first consumer device 114a, as depicted by S11 in FIG. 1B. The first content consumer 110a associated with the first consumer device 114a and/or the at least first node 102a may be configured to communicate the license request to the fourth node 102x, as depicted by S12 in FIG. 1B, that corresponds to the DRM license system owned by the second participant 108b with the media content item metadata received from the first node 102a upon selection to consume the media content item.

The fourth node 102x may be configured to verify the authenticity of the license request based on the comparison of the signature of the license request from the first participant 108a with the one or more cryptographic keys. The fourth node 102x may be further configured to verify that the media content rights exist on the distributed media rights transaction ledger 104 for the first content consumer 110a to consume the media content item based on the instance of the distributed media rights transaction ledger 104 associated with the second node 102b. Based on the verification, the fourth node 102x may be configured to issue the distributed media rights transaction to the distributed media rights transaction ledger 104 within the communication network 106 of acceptance of the license request and consumption of media content item by the first content consumer 110a. The fourth node 102x may be configured to respond to the license request with the DRM-managed media license that enables consumption of the media content item, as depicted by S13 in FIG. 1B. Finally, the fourth node 102x may be configured to transmit the DRM-managed media license to the first consumer device 114a that executes playback of the media content item by use of DRM-managed media license in specified manner consistent with DRM of media content, as depicted by S14 in FIG. 1B.

Figure 2:
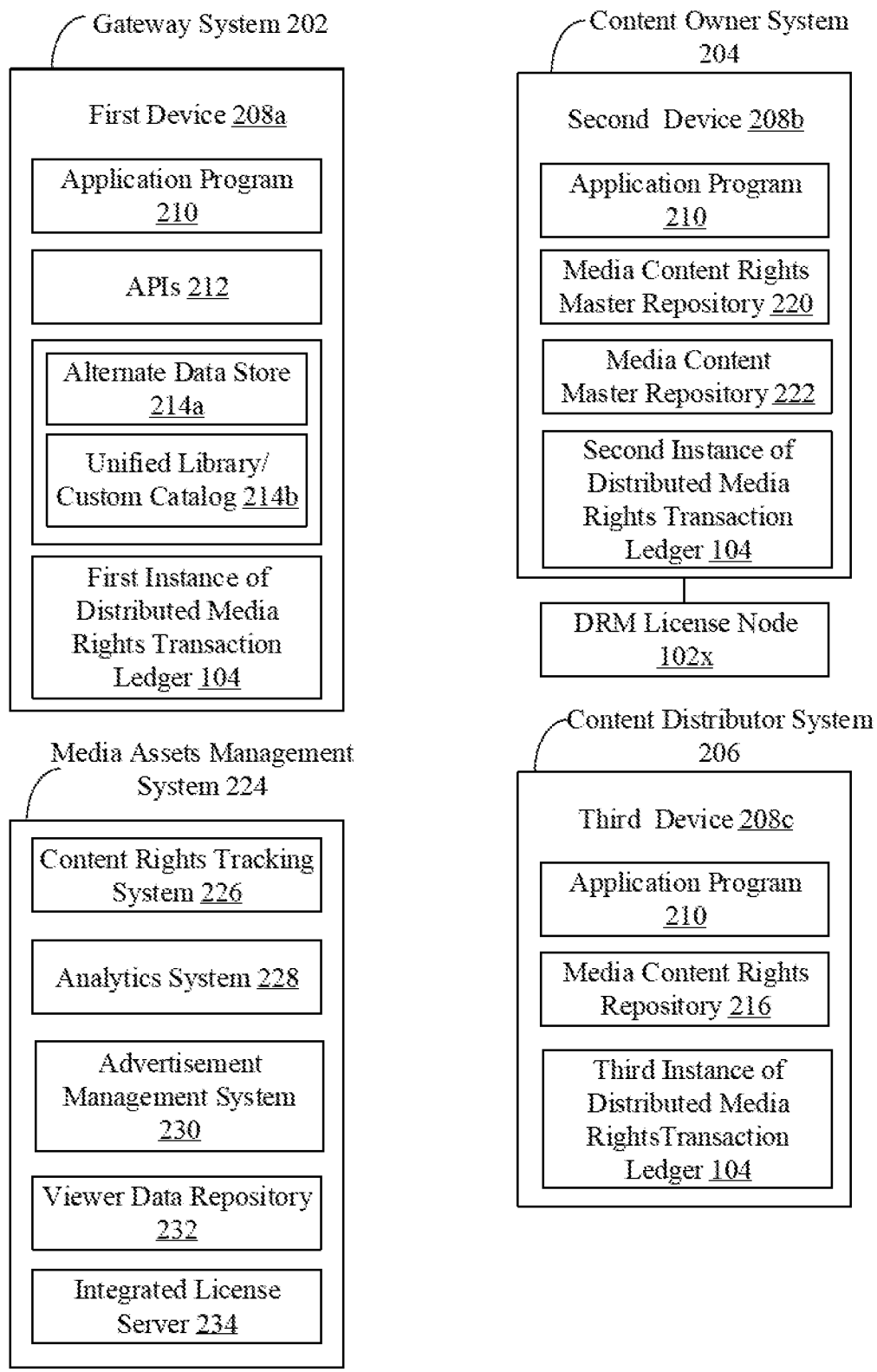
FIG. 2 depicts exemplary block diagrams for various systems of a distributed communication network 106 in the ecosystem 100 of FIG. 1A, in accordance with an exemplary embodiment of the disclosure.

FIG. 2 depicts exemplary block diagrams for various systems of a distributed communication network 106 in the ecosystem 100 of FIG. 1A, in accordance with an exemplary embodiment of the disclosure. With reference to FIG. 2, there are shown a gateway system 202, a content distributor system 206, a content owner system 204, and a media assets management system 224. The gateway system 202 may correspond to the first entity associated with the first node 102a of the plurality of nodes 102a, . . . , 102n described in FIG. 1A. Similarly, the content owner system 204 may correspond to the second entity associated with the second node 102b of the plurality of nodes 102a, . . . , 102n described in FIG. 1A. Similarly, the content distributor system 206 may correspond to the third entity associated with the third node 102c of the plurality of nodes 102a, . . . , 102n described in FIG. 1A. The media assets management system 224 may correspond to an arbitrary node of the plurality of nodes 102a, . . . , 102n.

The gateway system 202 may include a first device 208a, an application program 210, APIs 212, an alternate store 214a, a unified library/custom catalog 214b, and a first instance of distributed media rights transaction ledger 104. The content owner system 204 may include a second device 208b, the application program 210, a media content rights master repository 220, a media content master repository 222, and a third instance of distributed media rights transaction ledger 104. The content owner system 204 is shown to be associated with a digital rights management (DRM) license node 102x. The content distributor system 206 may include a third device 208c, the application program 210, a media content rights repository 216, a media content repository 218, and a second instance of distributed media rights transaction ledger 104.

The media assets management system 224 may include a content rights tracking system 226, an analytics system 228, an advertisement management system 230, a viewer data repository 232, and an integrated license server 234. In some embodiments of the disclosure, the content rights tracking system 226, the analytics system 228, the advertisement management system 230, the viewer data repository 232, and the integrated license server 234 may be integrated to form a single integrated system. In other embodiments of the disclosure, the various systems may be distinct. Other separation and/or combination of the various entities of the exemplary media assets management system 224 illustrated in FIG. 2 may be done without departing from the scope of the disclosure.

The gateway system 202 may comprise suitable logic, circuitry, and interfaces that may be configured to execute code that is accessible to the plurality of consumer devices 114a, . . . , 114n via the APIs 212. The APIs 212 allow content consumers 110a, . . . , 110n to interact with the plurality of nodes 102a, . . . , 102n in the communication network 106, with an entity, that may represent a streaming media and VOD service provider or a direct broadcast satellite service provider, that owns the gateway system 202 acting on behalf of the plurality of consumer devices 114a, . . . , 114n. The interaction may result in acquisition of media content rights for the plurality of consumer devices 114a, . . . , 114n to consume media content and gather metadata associated with available media content.

The first device 208a may be owned by the gateway system 202 (or the first node 102a) and configured to store the application program 210, the APIs 212, and the first instance of distributed media rights transaction ledger 104. The first device 208a may be further configured to store or reference the alternate data store 214a and the unified library/custom catalog 214b. The alternate data store 214a may include a plurality of unique identities which may be represented as a cryptographic value corresponding to each valid content consumer. The alternate data store 214a may be created using at least the distributed media rights transaction ledger 104, in which each new content consumer joining the communication network 106 is recorded as a media content rights transaction. A requesting content consumer is validated in case the identity which may be represented as a cryptographic value of the requesting content consumer is found in the alternate data store 214a based on a match of the identity hash value with one of the plurality of unique identifiers stored in the alternate data store 214a or the first instance of the distributed media rights transaction ledger 104.

The gateway system 202 may be configured to present metadata of multiple content libraries that may be owned by different entities, for example, different content owners, distributors, re-distributors, VOD service providers, and the like, as the unified library/custom catalog 214b for the content consumers 110a, . . . , 110n, to navigate. In this regard, the unified library/custom catalog 214b may correspond to a collection of media content belonging to one or more entities having media content rights available for acquisition, distribution, and/or consumption. Further, the unified library/custom catalog 214b may be identified prepared and presented on-the-fly specifically for a content consumer, such as the first content consumer 110a, based on consumer behavior and consumption pattern of the first content consumer 110a, for playback.

Currently due to isolated content libraries and different subscriber base, a narrow view of content consumers related to media consumption pattern is available. The gateway system 202 may solve this problem by presenting metadata of multiple content libraries as the unified library/custom catalog 214b. Based on the communication network 106, an industry-wide network and ecosystem 100 is created, where an industry-wide single sign-on for the content consumers 110a, . . . , 110n, may be provided by the gateway system 202 to navigate through an industry-wide shared content library, where media content rights to may be dynamically acquired, distributed, and enforced, by way of media content rights transactions. Thus, previously untapped markets may be identified, and un-monetized media content may be monetized by dynamic provisioning of media content rights to an accepting entity. In accordance with an embodiment, the gateway system 202 may also include the first instance of the distributed media rights transaction ledger 104, and thus may also function as a node. This node or another node associated with the same entity (e.g., a service provider that controls or owns the gateway system 202) may be required to update corresponding distributed media rights transaction ledger 104, in accordance with the media content rights transactions proxied for each content consumer (i.e., playback of requested media contents, ad plays, content requests, and the like.) Such update may be broadcasted to other connected nodes of the plurality of nodes 102a, . . . , 102n for synchronization of the recently updated media content rights transaction in the distributed media rights transaction ledger 104 across the plurality of nodes 102a, . . . , 102n.

The content owner system 204 may comprise suitable logic, circuitry, and interfaces that may be configured to execute code to own a collection of media content rights to be sold/distributed to content distributors, such as the second node 102b, and/or content consumers, such as the plurality of content consumers 110a, . . . , 110n. The content owner system 204 may be further configured to issue licenses to such content consumers for consumption of the media content. As illustrated in FIG. 2, the content owner system 204 may own the second device 208b that may be configured to store the application program 210, the second instance of the distributed media rights transaction ledger 104, the media content rights master repository 220, and the media content master repository 222. The media content master repository 222 may be a database of media content or media assets that are owned by the content owner system 204. The media assets may include uncompressed content, live content segments of one or more live feeds of channels, and/or VOD content. Generally, the term "content," "media," "media assets" and similar words are used interchangeably to refer to any type of media—audio, videos, datacasts, music, text, images, graphics, articles, photos, photo galleries, video galleries, infographics, maps, polls, guest biographies, tweets or other social media, blog posts, and/or the like. The media content rights master repository 220 may be a database of media content rights associated with the media content, available for negotiation. A media content right may be an electronic implementation of a legal contract designed to allow only authorized redistribution of digital media content and restrict the ways the media content is consumed.

The DRM license node 102x may correspond to a DRM license server for media content (that belongs to the content owner system 204) stored in the media content master repository 222. Metadata necessary to acquire a license from the DRM license node 102x associated with the content owner system 204, may include, but is not limited to, a distributed media rights transaction ledger identifier representing a media content, a distributed media rights transaction ledger identifier of an entity (that belongs to, for example the gateway system 202) facilitating the consumption of playback, and a distributed media rights transaction ledger identifier representing a content consumer. Such identifiers may be encrypted and hashed by the entity facilitating the consumption of playback, creating a cryptographic signature which may be used to validate the origin of the request.

The content distributor system 206 may comprise suitable logic, circuitry, and interfaces that may be configured to execute code to acquire media content rights to distribute the media content (that it does not own) to other content distributors and/or content consumers. In accordance with an embodiment, the content distributor system 206 may act on content consumer's behalf. In accordance with an embodiment, the content distributor system 206 may also act as a content owner, in tandem. As illustrated in FIG. 2, the content distributor system 206 may own the third device 208c that may be configured to store the application program 210, the second instance of the distributed media rights transaction ledger 104, the media content rights repository 216, and the media content repository 218.

The media assets management system 224 may comprise suitable logic, circuitry, and interfaces that may be configured to execute code for being owned or managed by an entity and may operate at least one node of the plurality of nodes 102a, . . . , 102n. In some embodiments, the media assets management system 224 may be jointly owned or managed by a group of entities in one country or multiple countries, where each entity operates at least one node of the plurality of nodes 102a, . . . , 102n. In some embodiments, the media assets management system 224 may be a public and open system, services of which may be partially or completely available to all the nodes of the plurality of nodes 102a, . . . , 102n in the communication network 106.

The content rights tracking system 226 may comprise suitable logic, circuitry, and interfaces that may be configured to execute code for tracking the media content rights or the flow of the media content rights of one or more media assets among various participants of the communication network 106 using the distributed media rights transaction ledger 104 maintained at each node. The content rights tracking system 226 increases operational efficiencies in the digital media and television content processing and digital rights management by allowing on-the-fly tracking of the media content rights or the flow of the media content rights of one or more media assets among various participants of the communication network 106 using the distributed media rights transaction ledger 104.

The analytics system 228 may comprise suitable logic, circuitry, and interfaces that may be configured to execute code for identifying (on-the-fly) a custom catalog specifically for a content consumer, such as the first content consumer 110a. The analytics system 228 may be further configured to prepare the custom catalog, and make available to the first content consumer 110a, via the gateway system 202. In some embodiments, the analytics system 228 may be configured to communicate the identified custom catalog to a particular node of an entity or a set of nodes of different entities subscribed to services of the analytics system 228. Thereafter, a scheduler system (not shown) of at least one node may be configured to prepare the custom catalog and make available to the first content consumer 110a. Similar to the first content consumer 110a, based on behavior and consumption pattern of the plurality of content consumers 110a, . . . , 110n, a custom catalog comprising selected media assets, may be identified, prepared, and presented to each of the plurality of content consumers 110a, . . . , 110n on respective plurality of consumer devices 114a, . . . , 114n for media consumption.

The advertisement management system 230 may comprise suitable logic, circuitry, and interfaces that may be configured to execute code for dynamic insertion of pre-encoded VOD assets, or advertisement media, or other promotional media based on real-time data of media consumption of a particular media asset via the gateway system 202. The real-time data of media consumption may be received when a media content rights transaction related to the media consumption of media content is detected for a content consumer. In some embodiments, the advertisement media item (i.e., an ad) may be dynamically inserted at a specified position in the media asset associated with a detected content placement opportunity (CPO). The insertion may be based on presence of an inbound trigger, such as society of cable telecommunication engineers (SCTE)-104/35-based trigger, at the specified position associated with the detected CPO. The manipulation of the catalogs or programming schedules may be driven by real time or near-real time change in user consumption behavior (that governs demand for particular type of content).

The viewer data repository 232 may comprise suitable logic, circuitry, and interfaces that may be configured to execute code for storing an industry-wide user behavioral data for the digital media and television content industry. The viewer data repository 232 may include individual consumer-based information and aggregate audience-based information. The individual consumer-based information may include parameters, such as favorite media assets, most preferred genre of media assets, most watched TV shows, and other content consumer-specific media preferences. The audience-based parameters may include calculated values derived by processing of media consumption data of a group of content consumers segregated by age, region, and the like. The group of content consumers may be associated with respective consumer devices of the plurality of consumer devices 114a, . . . , 114n. By use of the viewer data repository 232, content development by an entity, such as content owners, may target a known market with precision. The behavioral data of the content consumers may be shared among the entities, such as the content owners and the content distributors, without involvement of any third-party that currently measures viewership data and sells such data to content owners and distributors at a premium/high (mark-up) cost.

The integrated license server 234 may correspond to an integrated DRM server managed or shared by multiple entities. In some embodiments, content rights of certain media assets may be dynamically acquired from the plurality of different content owners using a single integrated license server, such as the integrated license server 234. In some embodiments, each entity, such as a content owner or a content distributor, may have their own DRM server to provide media content rights. Further in some embodiments, media content rights may be dynamically and automatically generated and provided to the asking entity by the integrated license server 234 based on the agreed parameters in a final media content rights transaction.

Figure 3A:
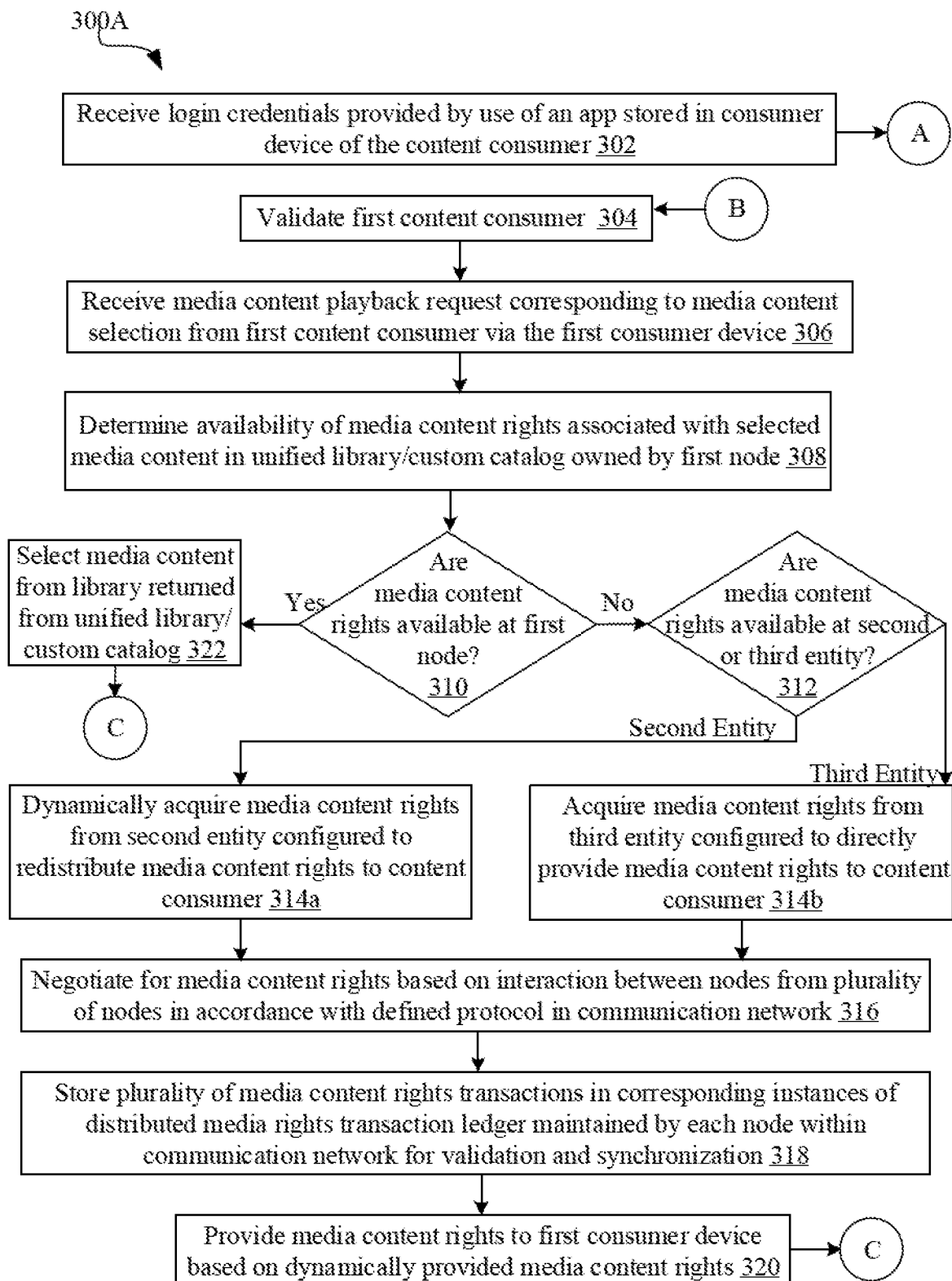
FIGS. 3A and 3B collectively depict a flow chart illustrating exemplary operations for providing media content items to content consumers for playback and consumption in the ecosystem 100 of FIG. 1A, in accordance with an exemplary embodiment of the disclosure.
Figure 3B:
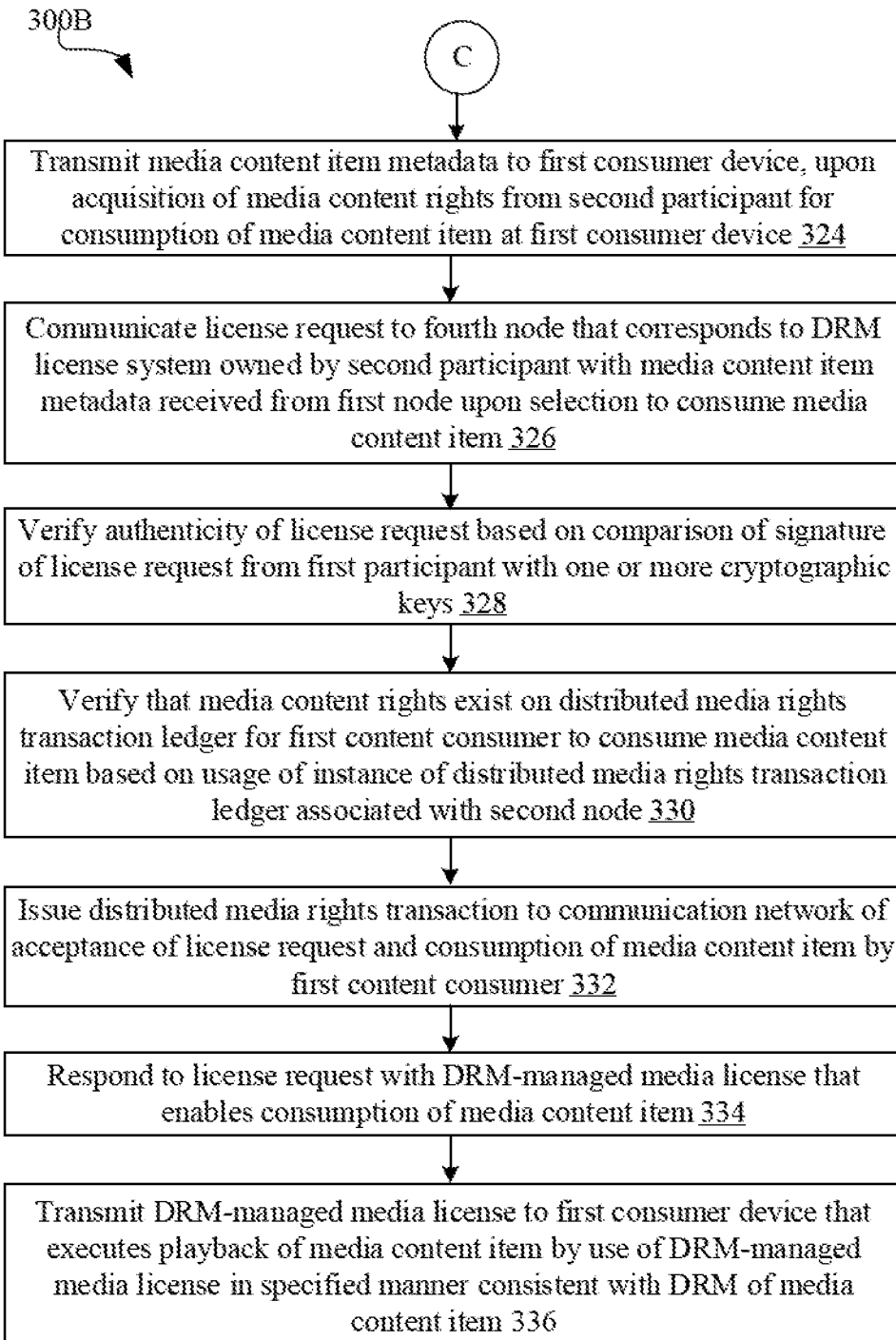
Figure 4:
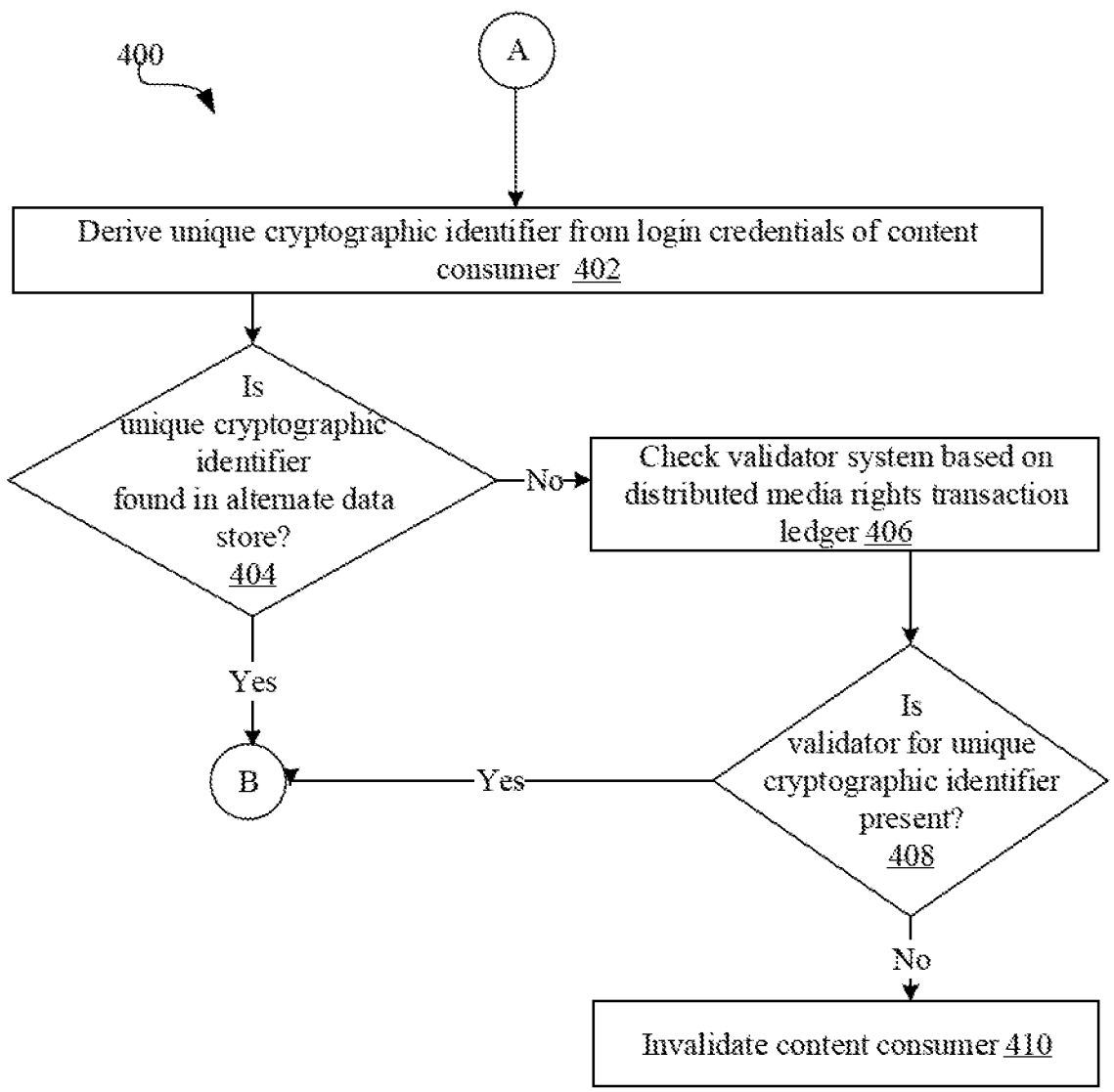
FIG. 4 depicts a flow chart illustrating exemplary operations for validation of an identity of a content consumer in a communication network of the ecosystem 100 of FIG. 1A, in accordance with an exemplary embodiment of the disclosure.

FIGS. 3A and 3B collectively depict a flow chart illustrating exemplary operations for providing media content items to content consumers for playback and consumption in the ecosystem 100 of FIG. 1A, in accordance with an exemplary embodiment of the disclosure. With reference to FIGS. 3A and 3B, there are shown flowcharts 300A and 300B. Further, FIG. 4 depicts a flow chart illustrating exemplary operations for validation of an identity of a content consumer in a communication network of the ecosystem 100 of FIG. 1A, in accordance with an exemplary embodiment of the disclosure. With reference to FIG. 4, there is shown a flowchart 400. FIGS. 3A, 3B, and 4 are described herein in conjunction with each other.

At 302, login credentials provided by use of an app stored in the first consumer device 114a of the first content consumer 110a may be received. In accordance with an embodiment, a node, such as the first node 102a, of the plurality of nodes 102a, . . . , 102z may be configured to receive login credentials, such as a username and a password, from the content consumer, such as the first content consumer 110a, via a consumer device, such as a first consumer device 114a. The first consumer device 114a may provide the login credentials by use of an app, for example, a mobile app or a TV app, stored in the first content consumer 110a.

In accordance with an embodiment, the first node 102a may correspond to the gateway system 202, such as the streaming media and VOD service provider. In accordance with an embodiment, the request may be received by the node, such as first node 102a, that is accessible to the plurality of consumer devices 114a, . . . , 114n, via the APIs 212. The APIs 212 may allow the plurality of content consumers 110a, . . . , 110n to interact with the plurality of nodes 102a, . . . , 102z in the communication network 106.

In accordance with an embodiment, the content consumer such as the first content consumer 110a, associated with the first consumer device 114a, may be a participant in the communication network 106 but may not be required to operate a node of the plurality of nodes 102a, . . . , 102z.

Referring to flowchart 400 in FIG. 4, at 402, a unique cryptographic identifier may be derived from the login credentials of the first content consumer 110a. In accordance with an embodiment, the first node 102a may be configured to derive the unique cryptographic identifier, such as a unique string of alphanumeric characters of defined length, from the login credentials of the first content consumer 110a by use of, for example a hashing algorithm, defined in the communication network 106. In accordance with various embodiments, the unique cryptographic identifier may be a public key-private key pair, a unique identifier, or a hash value corresponding to the first content consumer 110a.

At 404, it may be determined whether the unique cryptographic identifier is found in the alternate data store 214a associated with the first node 102a. The alternate data store 214a may be created using at least the distributed media rights transaction ledger 104, in which each new content consumer joining the communication network 106 is recorded as a media content rights transaction. In cases, where the unique cryptographic identifier of the first content consumer 110a is found in the alternate data store 214a, the control passes back to 304 in flowchart 300A of FIG. 3A, else to 406 in flowchart 400 of FIG. 4.

At 406, a validator system (not shown) may be checked based on the distributed media rights transaction ledger 104. In accordance with an embodiment, the validator systems that may include entities that may have previously interacted with the first content consumer 110a may be checked using the distributed media rights transaction ledger 104. The validator system may request validation of the identity of the first content consumer 110a from a prior owner, for example the direct broadcast satellite service provider, using the distributed media rights transaction ledger 104. When the first content consumer 110a is interacting through the first node 102a (for example the gateway system 202), which belongs to a given entity in the communication network 106, the first content consumer 110a may be considered to be owned by the first node 102a. This may secure the communication network 106 by ensuring that: a) first content consumer 110a media content rights transactions adhere to the defined protocol as enforced by the proxying node, for example the first node 102a; b) the entity, for example the gateway system 202, assumes responsibility over media content rights transactions requested by the first content consumer 110a; and c) another entity, such as the validator system, may request to validate the identity of the first content consumer 110a from a prior owner, for example another gateway system, using the distributed media rights transaction ledger 104.

At 408, it may be determined whether a validator is present for the unique cryptographic identifier using the distributed media rights transaction ledger 104. In an embodiment, a validator is found for the unique cryptographic identifier of the first content consumer 110a using the distributed media rights transaction ledger 104, and the control passes back to 304 in flowchart 300A of FIG. 3A, else to 410.

At 410, the first content consumer 110a may be invalidated. In accordance with an embodiment, the first node 102a may invalidate the first content consumer 110a and deny an access to the communication network 106.

Referring to flowchart 300A in FIG. 3A, at 304, the first content consumer 110a may be validated. In accordance with an embodiment, the first node 102a may be configured to validate the first content consumer 110a based on the existence of the unique cryptographic identifier of the first content consumer 110a in the alternate data store 214a of the first node 102a or the distributed media rights transaction ledger 104. In accordance with an embodiment, the first node 102a may be configured to validate the first content consumer 110a based on the presence of the validator for the unique cryptographic identifier of the first content consumer 110a. Control passes to 306 for such validation of the first content consumer 110a.

At 306, media content playback request, corresponding to media content selection from the first content consumer 110a via the first consumer device 114a, may be received. In accordance with an embodiment, the first node 102a may be configured to receive media content playback request, corresponding to media content selection, from the first content consumer 110a via the first consumer device 114a. The first content consumer 110a via the first consumer device 114a may select the media content to generate the request for playback of the media content for consumption.

In accordance with an embodiment, the first content consumer 110a requests the first node 102a of the plurality of nodes 102a, . . . , 102z for the media content from a plurality of media content items. In one case, the plurality of media content items may include a first media content that the first node 102a and/or the first content consumer 110a has media content rights to. In another case, the plurality of media content items may include a second media content owned by the second participant 108b associated with the second node 102b. In such a case, the first participant 108a associated with the first node 102a does not have media content rights for redistribution of the second media content. In fact, the second participant 108b has redistribution media content rights, in absence of the media content rights with the first participant 108a or the first content consumer 110a, as further described below. In such case, the second node 102b of the plurality of nodes 102a, . . . , 102z associated with the second participant 108b, which owns the requested media content, is configured to provide the media content rights associated with the requested media content to the first participant 108a and/or the content consumer, such as the first content consumer 110a.

Hereinafter, 'the first media content', and 'the second media content' may be referred to as 'the media content'.

At 308, availability of the media content rights associated with the selected media content may be determined in the unified library/custom catalog 214b owned by the first node 102a. The unified library/custom catalog 214b may correspond to a collection of media content belonging to one or more entities having media content rights available for acquisition, distribution, and/or consumption. In accordance with an embodiment, first content consumer 110a may provide a selection of a new media content which is not presented by the unified library/custom catalog 214b. For example, the unified library/custom catalog 214b may include media content that is previously purchased by the first content consumer 110a (for example, iTunes®), media content owned the first node 102a (for example Netflix®), media content for which the first node 102a (for example Netflix®) has rights to redistribute, and media content (for example media content from Disney®) for which the first node 102a (for example Netflix®) does not have media content rights.

At 310, it may be determined whether the media content rights (associated with selected media content) are available. In accordance with an embodiment, the first node 102a may determine whether the media content rights (associated with selected media content) are available in the unified library/custom catalog 214b owned by the first node 102a. In this regard, it may be determined whether the first content consumer 110a or the first entity associated with the first node 102a have an access to the media content rights associated with the selected media content in the unified library/custom catalog 214b owned by the first node 102a.

In accordance with an embodiment, the first node 102a may determine that the media content rights (associated with selected media content) are available in the unified library/custom catalog 214b. Accordingly, the control passes to 322. In accordance with another embodiment, the first node 102a may determine that the media content rights (associated with selected media content) are not available in the unified library/custom catalog 214b. Accordingly, the control passes to 312.

At 322, when the media content rights associated with the selected media content are available at the first node 102a, the media content may be selected from the unified library/custom catalog 214b provided by the first node 102a. In this regard, the first content consumer 110a may select the media content from the unified library/custom catalog 214b identified, prepared, and presented by first node 102a. The first entity who owns the gateway node, such as the first node 102a, may act on behalf of the first content consumer 110a to acquire the media content rights to consume the media content and gather metadata associated with the available media content.

At 312, it may be determined whether the media content rights (associated with selected media content) are available with the second entity or the third entity. In accordance with another embodiment, the first node 102a may determine that the media content rights (associated with selected media content) are available with the second entity, for example the content owner system 204, associated with the second node 102b. Accordingly, control passes to 314a. In accordance with an embodiment, the first node 102a may determine that the media content rights (associated with selected media content) are available with the third entity, for example the content distributor system 206, associated with the third node 102c. Accordingly, control passes to 314b.

At 314a, the media content rights may be acquired from the second entity associated with the second node 102b configured to directly provide the media content rights to the first content consumer 110a. In accordance with an embodiment, the first node 102a may be configured to acquire the media content rights from the second entity associated with the second node 102b (that may directly provide the media content rights) by negotiating with the second entity associated with the second node 102b that owns the media content and associated media content rights. In this regard, the first content consumer 110a may consume the media content directly from the second entity associated with the second node 102b via the first node 102a. Thus, the first entity associated with the first node 102a of the plurality of nodes 102a, . . . , 102n interacts with the corresponding instance of the distributed media rights transaction ledger 104 in the communication network 106, may act on behalf of the first content consumer 110a to acquire one or more media content rights for consumption of the media content by the first consumer device 114a.

At 314b, the media content rights may be dynamically acquired from the third entity associated with the third node 102c configured to redistribute the media content rights to the first content consumer 110a. In accordance with an embodiment, the first node 102a may be configured to dynamically acquire the media content rights from the third entity associated with the third node 102c (that may redistribute the media content rights to the first content consumer 110a) by negotiating with the third entity associated with the third node 102c that has the media content rights to redistribute. In accordance with an embodiment, the first entity associated with the first node 102a may be configured to acquire the media content rights from the third entity associated with the third node 102c when the first content consumer 110a or the first entity associated with the first node 102a do not have an access of media content rights associated with the selected media content. In such embodiment, the third entity (such as a content distributor) associated with the third node 102c may have media content rights to distribute (or re-distribute) the first media asset, previously acquired from a second entity (such as a content owner) associated with the second node 102b. Thus, the first entity associated with the first node 102a of the plurality of nodes 102a, . . . , 102n interacts with the corresponding instance of the distributed media rights transaction ledger 104 in the communication network 106, may act on behalf of the first content consumer 110a to acquire one or more media content rights for consumption of the media content by the first consumer device 114a.

At 316, the media content rights may be negotiated for, based on interaction between nodes from the plurality of nodes 102a, . . . , 102z in accordance with defined protocol in the communication network 106. In accordance with an embodiment, the first entity associated with the first node 102a may be configured to negotiate with the second entity associated with the second node 102b or the first entity associated with the third node 102c for acquisition of the media content rights, based on interaction between nodes from plurality of nodes 102a, . . . , 102z in accordance with defined protocol in the communication network 106.

As described in FIG. 1A, each node of the plurality of nodes 102a, . . . , 102n may be associated with a corresponding entity, such as a content owner or a content distributor, from the plurality of entities 108a, . . . , 108n. In accordance with an embodiment, the first node 102a may be configured to create at least one media content rights transaction with one or more nodes, such as the second node 102b or the third node 102c of the plurality of nodes 102a, . . . , 102n. The one or more nodes may further cryptographically secure transaction data of the at least one media content rights transaction, which is stored in corresponding instance of the distributed media rights transaction ledger 104. In accordance with an embodiment, the one or more nodes may digitally sign the hash transaction data with a private key of a private key—public key pair, and share a public key of the private key—public key pair with remaining nodes of the plurality of nodes 102a, . . . , 102n and maintains the private key as a secret key.

The one or more media content rights transactions may comprise at least one of a cryptographic signature of an originating entity associated with a corresponding node, another cryptographic signature of a recipient entity, identities of the one or more media content rights for a specific media content, negotiated terms of the one or more media content rights, identities of one or more participants, disparate live media output stream for consumption by a content consumer and/or pre-encoded media asset, a descriptor for an intent of a media content rights transaction, an encrypted summary of a set of transactions, one or more cryptographic signatures of historic transactions from the distributed media rights transaction ledger to link at least two transactions, and a cryptographic hash of transaction data. In accordance with an embodiment, each of the plurality of media content rights transactions 112a, . . . , 112n may be categorized based on an announcement of a newly created entity, an announcement of a newly created content consumer, an announcement of a newly available media content, an acquisition of the one or more media content rights, and/or a consumption of the media content by a content consumer. In accordance with an embodiment, an invalid transaction may be added to the distributed media rights transaction ledger 104, remains invalid, and serves as a historical record of origin of invalid transactions.

In accordance with an embodiment, the first node 102a of the plurality of nodes 102a, . . . , 102n may be configured to manage at least one media content rights transaction of a plurality of media content rights transactions 112a, ..., 112n with remaining nodes, such as the one or more nodes of the plurality of nodes 102a, ..., 102n. The plurality of media content rights transactions 112a, ..., 112n may be managed by the plurality of nodes 102a, ..., 102n in accordance with the defined protocol in the communication network 106.

In accordance with an embodiment, the plurality of media content rights transactions 112a, ..., 112n may originate from a node, for example the first node 102a of the plurality of nodes 102a, ..., 102n, and facilitate exchange of data with one or more nodes, such as the second node 102b or the third node 102c, in the communication network 106.

In accordance with various embodiments, a node of the plurality of nodes 102a, ..., 102n may be further configured to verify one or more media content rights transactions of the plurality of media content rights transactions 112a, ..., 112n communicated by the one or more remaining nodes of the plurality of nodes 102a, ..., 102n. Further, the node may reject a set of invalid media content rights transactions from the one or more media content rights transactions 112a, ..., 112n. Furthermore, the node may create new media content rights transactions on behalf of at least one of a content consumer, content distributor, or content owner, and communicate the new media content rights transactions to the one or more remaining nodes where such new media content rights transactions may be stored in corresponding instances of the distributed media rights transaction ledger 104. In this regard, a receiving entity, such as the second and the third entities, may be responsible for cryptographically securing the entire set of media content rights transactions associated with the negotiation of media content rights, for example as a summary hash. The receiving entity may sign the summary has with its private key (of the same private key—public key pair used throughout the communication network 106 for corresponding entity). The receiving entity may be configured to collect the summary hash and broadcast as media content rights transaction to the entire communication network 106 to be added as a new media content rights transaction on the distributed media rights transaction ledger 104. The entities participating in the media content rights negotiations may elect to encrypt the details of the negotiation sequence to obscure the parameters of the final media content rights transaction from the distributed media rights transaction ledger 104.

In accordance with an embodiment, the node may be further configured to enforce a plurality of constraints associated with the one or more media content rights defined in at least one transaction of the plurality of media content rights transactions 112a, ..., 112n for a participant to acquire, distribute, or consume content associated with the one or more media content rights. Examples of the plurality of constraints may include, but are not limited to date/time range restriction of playback and/or length of media content rights transferal, rights transferal to specific receiving entity and/or restricted content consumers, number of times playback is allowed, possibility to transfer playback right to another content consumer or entity, downloading/offline access of media content rights and/or playback restrictions, whether sending and receiving entities can watch the media content simultaneously or if mutually exclusive rights transferal is permitted wherein only one party (i.e., either sending or receiving entities) can watch the media content at any moment in time, consumer device-related restrictions (for example mobile only, and no TVs allowed), and/or media content quality restrictions (for example, high definition is not available). In accordance with an embodiment, the node may be further configured to enforce an adherence of known nodes to the protocol by refusing or accepting to communicate with the known nodes of the plurality of nodes 102a, ..., 102n.

In accordance with an embodiment, the node, such as the first node 102a, may be further configured to create respective private channels to communicate private transactions between one or more entities via nodes, such as the second node 102b or the third node 102c. Each node may represent at least one participant on the communication network 106 based on signed transactions originated from the node with a cryptographic signature of corresponding participant. In accordance with an embodiment, the node may be further configured to determine one or more new nodes which join the communication network 106 within a defined time period, and communicate information associated with the plurality of nodes 102a, ..., 102n to the one or more new nodes.

At 318, the plurality of media content rights transactions 112a, ..., 112n may be stored in corresponding instances of the distributed media rights transaction ledger 104 maintained by each node within the communication network 106 for validation and synchronization. In accordance with an embodiment, the plurality of media content rights transactions 112a, ..., 112n may be stored in corresponding instances of the distributed media rights transaction ledger 104 maintained by each node of the plurality of nodes 102a, ..., 102n within the communication network 106 for validation and synchronization. Each instance of the distributed media rights transaction ledger 104 may include the plurality of media content rights transactions 112a, ..., 112n categorized and defined based on the defined protocol. In accordance with an embodiment, the one or more nodes of the plurality of nodes 102a, ... 102n associated with the plurality of participants 108a, ..., 108n and 110a, ..., 110n may be configured to store the plurality of media content rights transactions 112a, ..., 112n in corresponding instances of the distributed media rights transaction ledger 104 maintained by each node of the plurality of nodes 102a, ..., 102n within the communication network 106 for validation and synchronization. In this regard, each node may append its own media content right transactions as well as media content right transactions from other nodes in its own instance of the distributed media rights transaction ledger 104.

In accordance with various embodiments, the distributed media rights transaction ledger 104 may be configured to maintain, across the plurality of participants 108a, ..., 108n and 110a, ..., 110n, a validated state of the one or more media content rights granted. The distributed media rights transaction ledger 104 may maintain a secured and validated historical record of consumption of the media content by the plurality of content consumers 110a, ..., 110n, and maintain secured and validated identities of the plurality of participants 108a, ..., 108n and 110a, ..., 110n. The distributed media rights transaction ledger 104 may further maintain a history of constraints for acquisition, distribution, consumption, and transfer of ownership of the one or more media content rights. The distributed media rights transaction ledger 104 may further maintain a history of negotiations via a sequence of media content rights transactions which occur between at least two participants of the plurality of participants 108a, ..., 108n and 110a, ..., 110n.

In accordance with an embodiment, data for the plurality of media content rights transactions 112a, ..., 112n for the distributed media rights transaction ledger 104 may be synchronized across the plurality of nodes 102a, ..., 102n in the communication network 106. Thus, the distributed media rights transaction ledger 104 may be secured to ensure integrity of data shared across the plurality of nodes 102a, ..., 102n. In accordance with an embodiment, the at least one node of the plurality of nodes 102a, ..., 102n may be further configured to maintain a corresponding instance of the distributed media rights transaction ledger 104 and communicate the corresponding instance of the distributed media rights transaction ledger 104 to the one or more remaining nodes upon request.

At 320, the media content rights may be provided to the first consumer device 114a based on the dynamically provided media content rights. In accordance with an embodiment, the first node 102a may be configured to provide the media content rights acquired from the second node 102b or the third node 102c to the first consumer device 114a. In accordance with an embodiment, the media player of the first consumer device 114a may be provided a link of the media content from the media content master repository 222 of the second entity associated with the second node 102b to start viewing the media content based on the dynamically acquired media content rights.

At 324, media content item metadata may be transmitted to the first consumer device 114a, upon acquisition of media content rights from the second participant 108b for consumption of media content item at the first consumer device 114a. In accordance with an embodiment, the first node 102a may be configured to transmit the media content item metadata to the first consumer device 114a, upon acquisition of media content rights from the second participant 108b for consumption of media content item at the first consumer device 114a.

The transmitted media content metadata may comprise at least one or more constraints associated with the consumption of the media content, a location of the fourth node 102x of the plurality of nodes 102a, ..., 102z that corresponds to a DRM license system integrated with the second participant 108b associated with the second node 102b, and metadata required to acquire the DRM-managed media license from the fourth node 102x. The one or more constraints may limit the first consumer device 114a to consume the media content. In this regard, the one or more constraints associated with the consumption of the media content, may enable the first consumer device 114a to alter behavior based on the one or more constraints. Examples of the one or more constraints may include, but are not limited to, date and time range restriction of the playback of the media content, a number of times the playback is allowed, a possibility to transfer playback rights to another participant, and downloading or offline playback restriction.

The transmitted media content metadata may further comprise location of the fourth node 102x, which is associated with the second participant 108b, a first distributed ledger identifier that represents the media content, a second distributed ledger identifier of the first participant 108a that facilitates the consumption of the media content, and a third distributed ledger identifier that represents the first content consumer 110a. The first distributed ledger identifier, the second distributed ledger identifier, and the third distributed ledger identifier may be encrypted and hashed. Accordingly, a cryptographic signature may be created based on the encrypted and hashed first distributed ledger identifier, the second distributed ledger identifier, and the third distributed ledger identifier. The cryptographic signature may be utilized to validate an origin of the media content playback request.

At 326, a license request may be communicated to the fourth node 102x that corresponds to a DRM license system owned by the second participant 108b with the media content item metadata received from the first node 102a upon selection to consume the media content item. In accordance with an embodiment, the first content consumer 110a associated with the first consumer device 114a and/or the at least first node 102a may be configured to communicate the license request to the fourth node 102x that corresponds to the DRM license system owned by the second participant 108b with the media content item metadata received from the first node 102a upon selection to consume the media content item.

At 328, authenticity of the license request may be verified based on comparison of signature of the license request from the first participant 108a with one or more cryptographic keys. In accordance with an embodiment, the fourth node 102x may be configured to verify the authenticity of the license request based on the comparison of the signature of the license request from the first participant 108a with the one or more cryptographic keys. Such verification of the authenticity of the license request may ensure that the license request is received from a valid first content consumer 110a, or a valid first participant 108a, or both.

At 330, existence of the media content rights on the distributed media rights transaction ledger 104 may be verified for the first content consumer 110a to consume the media content item based on usage of instance of the distributed media rights transaction ledger 104 associated with the second node 102b. In accordance with an embodiment, the fourth node 102x may be configured to verify that the media content rights exist on the distributed media rights transaction ledger 104 for the first content consumer 110a to consume the media content item based on usage of instance of the distributed media rights transaction ledger 104 associated with the second node 102b.

In this regard, the fourth node 102x may verify that media content rights exist on the distributed media rights transaction ledger 104 for the first content consumer 110a to consume the selected media content, using the second instance of the distributed media rights transaction ledger 104. Since the first content consumer 110a is owned by the first participant 108a, that acquired the media content rights for the first content consumer 110a, there should be a valid media content rights transaction on the distributed media rights transaction ledger 104 to verify the same. It may be noted that the second node 102b utilizes its own copy, i.e. the second instance, of the distributed media rights transaction ledger 104, that includes the media content rights transactions validated by the second node 102b itself to ensure security.

For such verification of the existence of the media content rights on the distributed media rights transaction ledger 104 for the first content consumer 110a, the fourth node 102x may be configured to traverse a first plurality of records of media content rights that belong to the first content consumer 110a for the selected media content. The fourth node 102x may be further configured to determine a set of restrictions that exist for the playback of the media content. The fourth node 102x may be further configured to traverse a second plurality of records of the first participant 108a and/or the second participant 108b that distributed the media content rights to the first content consumer 110a for consumption and ensure that no restrictions exist for the first content consumer 11a to continue to consume the media content.

At 332, a distributed media rights transaction may be issued to the communication network 106 of acceptance of the license request and consumption of media content item by the first content consumer 110a. In accordance with an embodiment, the fourth node 102x may be configured to issue the distributed media rights transaction to the communication network 106 of acceptance of the license request and consumption of media content item by the first content consumer 110a.

In accordance with various embodiments, the fourth node 102x may be further configured to issue the distributed media rights transaction to the communication network 106 of the acceptance of the license request and consumption of the media content by the first content consumer 110a such that a history of the consumption of the media content by the first content consumer 110a is recorded on the distributed media rights transaction ledger 104. Further, a history of the first participant 108a who facilitated the consumption of the media content for the first content consumer 110a is recorded on the distributed media rights transaction ledger 104. Furthermore, an audit trail of the consumption of the media content is recorded on the distributed media rights transaction ledger 104.

At 334, the license request may be responded to with DRM-managed media license that enables consumption of media content item. In accordance with an embodiment, the fourth node 102x may be configured to respond to the license request with the DRM-managed media license that enables consumption of the media content item.

In accordance with an embodiment, the DRM-managed media license may include one or more constraints according to DRM of the media content in accordance with a set of restrictions of the media content rights of the first content consumer 110a to consume the media content. Such DRM-managed media license including the one or more constraints may enforce concise rules, including download ability, date range of the playback of the media content, and frequency of the playback of the media content.

At 336, the DRM-managed media license may be transmitted to the first consumer device 114a that executes playback of the media content item by use of DRM-managed media license in specified manner consistent with DRM of media content. In accordance with an embodiment, the fourth node 102x may be configured to transmit the DRM-managed media license to the first consumer device 114a that executes playback of the media content item by use of DRM-managed media license in specified manner consistent with DRM of media content.

Figure 5:
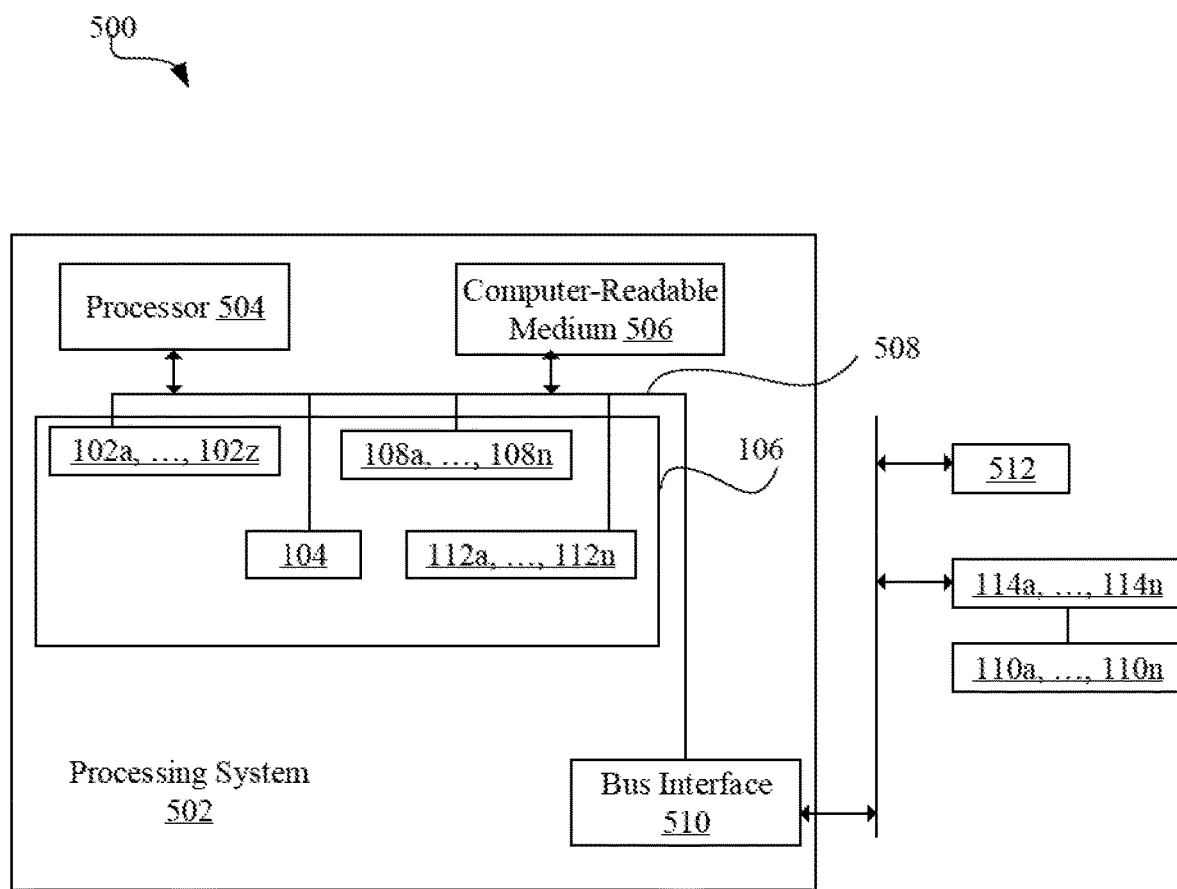
FIG. 5 is a conceptual diagram illustrating an example of a hardware implementation for a system employing a processing system for providing media content items to content consumers for playback and consumption, in accordance with an exemplary embodiment of the disclosure.

FIG. 5 is a conceptual diagram illustrating an example of a hardware implementation for a system employing a processing system for providing media content items to content consumers for playback and consumption, in accordance with an exemplary embodiment of the disclosure. Referring to FIG. 5, the hardware implementation shown by a representation 500 for the ecosystem 100 employs a processing system 502 for providing media content items to content consumers for playback and consumption, in accordance with an exemplary embodiment of the disclosure, as described herein.

In some examples, the processing system 502 may comprise one or more hardware processors 504, a non-transitory computer-readable medium 506, a bus 508, a bus interface 510, and a transceiver 512. FIG. 5 further illustrates the plurality of nodes 102a, ..., 102z, the distributed media rights transaction ledger 104, the plurality of entities 108a, ..., 108n, and the plurality of media content rights transactions 112a, ..., 112n, as described in detail in FIG. 1A.

The hardware processor 504 may be configured to manage the bus 508 and general processing, including the execution of a set of instructions stored on the non-transitory computer-readable medium 506. The set of instructions, when executed by the hardware processor 504, causes the ecosystem 100 to execute the various functions described herein for any particular apparatus. The hardware processor 504 may be implemented, based on a number of processor technologies known in the art. Examples of the hardware processor 504 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 506 may be used for storing data that is manipulated by the hardware processor 504 when executing the set of instructions. The data is stored for short periods or in the presence of power. The non-transitory computer-readable medium 506 may also be configured to store data for the plurality of nodes 102a, ..., 102z, the distributed media rights transaction ledger 104, the plurality of entities 108a, ..., 108n, and the plurality of media content rights transactions 112a, ..., 112n.

The bus 508 is configured to link together various circuits. In this example, the ecosystem 100 employing the processing system 502 and the non-transitory computer-readable medium 506 may be implemented with bus architecture, represented generally by bus 508. The bus 508 may include any number of interconnecting buses and bridges depending on the specific implementation of the ecosystem 100 and the overall design constraints. The bus interface 510 may be configured to provide an interface between the bus 508 and other circuits, such as, transceiver 512, and external devices, such as the plurality of consumer devices 114a, ..., 114n associated with respective content consumers of the plurality of content consumers 110a, ..., 110n.

The transceiver 512 may be configured to provide a communication of the communication network 106 with various other apparatus, such as the plurality of consumer devices 114a, ..., 114n associated with respective content consumers of the plurality of content consumers 110a, ..., 110n, via the network 116. The transceiver 512 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 5 may include software whose corresponding code may be executed by at least one processor, for across multiple processing environments. For example, the plurality of nodes 102a, ..., 102z, the distributed media rights transaction ledger 104, the plurality of entities 108a, ..., 108n, and the plurality of media content rights transactions 112a, ..., 112n, may include software that may be executed across a single or multiple processing environments.

In an aspect of the disclosure, the hardware processor 504, the non-transitory computer-readable medium 506, or a combination of both may be configured or otherwise specially programmed to execute the operations or functionality of the plurality of nodes 102a, . . . , 102z, the distributed media rights transaction ledger 104, the plurality of entities 108a, . . . , 108n, and the plurality of media content rights transactions 112a, . . . , 112n, or various other components described herein, as described with respect to FIGS. 1A to 4.

Various embodiments of the disclosure comprise the ecosystem 100 that may be configured to establish a network of nodes and participants for dynamic management of media content rights. In an embodiment, the ecosystem 100 may comprise a plurality of nodes 102a, . . . , 102z configured to interact with each other in accordance with a defined protocol in the communication network 106. The ecosystem 100 may include plurality of nodes 102a, . . . , 102z configured to interact with each other in accordance with a defined protocol in the communication network 106. The first node 102a of the plurality of nodes 102a, . . . , 102z associated with the first participant 108a may be configured to receive a request for playback of a media content from a content consumer, such as the first content consumer 110a, associated with a consumer device, such as the first consumer device 114a. The second node 102b of the plurality of nodes 102a, . . . , 102z may be associated with the second participant 108b, which owns the requested media content. The second participant 108b may be configured to provide media content rights associated with the requested media content to the first participant 108a and/or the content consumer, such as the first content consumer 110a. The first node 102a may be further configured to provide a media content metadata to the first consumer device 114a for consumption by the first consumer device 114a. A plurality of instances of the distributed media rights transaction ledger 104 may be associated with a respective node of the plurality of the nodes 102a, . . . , 102z. The media content metadata may be received from an instance of the plurality of instances of the distributed media rights transaction ledger. Each instance of the distributed media rights transaction ledger 104 may include a plurality of media content rights transactions corresponding to at least an acquisition of the media content rights by the first participant 108a and/or first content consumer 110a prior to the consumption of the media content at the first consumer device 114a. The plurality of media content rights transactions 112a, . . . , 112n may be categorized and defined based on the defined protocol. The plurality of media content rights transactions 112a, . . . 112n may be managed by the plurality of nodes 102a, . . . , 102z in accordance with the defined protocol in the communication network 106.

In accordance with an embodiment, the first content consumer 110a may request the first node of the plurality of nodes 102a, . . . , 102z for the media content from a plurality of media content items. The first content consumer 110a may select the media content from the plurality of media content items for consumption at the first consumer device 114a.

In accordance with an embodiment, the plurality of media content items may include first media content that the first participant 108a and/or the first content consumer 110a has media content rights to, or second media content owned by the second participant 108b associated with the second node 102b. The first participant 108a associated with the first node 102a does not have media content rights for redistribution of the second media content.

In accordance with an embodiment, the first participant 108a associated with the first node 102a may be further configured to acquire the media content rights to redistribute to the first content consumer 110a based on negotiation with the second participant 108b associated with the second node 102b of the plurality of nodes 102a, . . . , 102z. The second participant 108b has redistribution media content rights, in absence of the media content rights with the first participant 108a or the first content consumer 110a.

In accordance with an embodiment, the first node 102a may be further configured to transmit the media content metadata to the first consumer device 114a, upon acquisition of the media content rights from the second participant 108b for the consumption of the media content at the first consumer device 114a. The transmitted media content metadata comprises at least one or more constraints associated with the consumption of the media content, a location of a fourth node 102x of the plurality of nodes 102a, . . . , 102z that corresponds to a DRM license system integrated with the second participant 108b associated with the second node 102b, and metadata required to acquire a DRM-managed media license from the fourth node 102x.

In accordance with an embodiment, the one or more constraints may limit the first consumer device 114a to consume the media content. The one or more constraints may comprise at least date and time range restriction of the playback of the media content, a number of times the playback is allowed, a possibility to transfer playback rights to another participant, and downloading or offline playback restriction. The media content metadata may comprise at least a first distributed ledger identifier that represents the media content, a second distributed ledger identifier of the first participant that facilitates the consumption of the media content, and a third distributed ledger identifier that represents the first content consumer 110a.

In accordance with an embodiment, the first participant 108a that facilitates the consumption of the media content, may be further configured to encrypt and hash the first distributed ledger identifier, the second distributed ledger identifier, and the third distributed ledger identifier. Further, the first participant 108a may create a cryptographic signature utilized to validate an origin of the request for the playback of the media content based on the encrypted and hashed first distributed ledger identifier, the second distributed ledger identifier, and the third distributed ledger identifier.

In accordance with an embodiment, the first consumer device 114a and/or the at least first node 102a may communicate a license request to the fourth node 102x of the plurality of nodes 102a, . . . , 102z that corresponds to a digital rights management (DRM) license system owned by the second participant 108b with the metadata received from the first node 102a, upon selection to consume the media content.

In accordance with an embodiment, based on the receipt of the license request from the first consumer device 114a, the fourth node 102x may be configured to verify authenticity of the license request based on comparison of a signature of the license request from the first participant 108a with one or more cryptographic keys, verify that the media content rights exist on the distributed media rights transaction ledger 104 for the first content consumer 110a to consume the media content based on usage of an instance of the distributed media rights transaction ledger 104 associated with the second node 102b, issue a media content rights transaction to the communication network 106 of an acceptance of the license request and consumption of the media content by the first content consumer 110a, and respond to the license request with the DRM-managed media license that enables the consumption of the media content.

In accordance with an embodiment, the fourth node 102x may be further configured to verify the existence of the media content rights on the distributed media rights transaction ledger 104 for the first content consumer 110a by at least (1) traversal of a first plurality of records of media content rights that belong to the first content consumer 110a for a selected media content, (2) determination of a set of restrictions that exist for the playback of the media content, and (3) traversal of a second plurality of records of the first participant 108a and/or the second participant 108b that distributed the media content rights to the first content consumer 110a for consumption, and ensure that no restrictions exist for the first content consumer 110a to continue to consume the media content.

In accordance with an embodiment, the fourth node 102x may be further configured to issue the transaction to the communication network 106 of the acceptance of the license request and consumption of the media content by the first content consumer 110a such that (1) a history of the consumption of the media content by the first content consumer 110a is recorded on the distributed media rights transaction ledger 104, (2) a history of the first participant 108a who facilitated the consumption of the media content for the first content consumer 110a is recorded on the distributed media rights transaction ledger 104, and (3) an audit trail of consumption of the media content is recorded on the distributed media rights transaction ledger 104.

In accordance with an embodiment, the DRM-managed media license may include one or more constraints according to DRM of the media content in accordance with a set of restrictions of the media content rights of the first content consumer 110a to consume the media content.

In accordance with an embodiment, the first content consumer 110a may receive the DRM-managed media license and execute the playback of the media content by use of DRM-managed media license in a specified manner consistent with the DRM of the media content.

In accordance with an embodiment, the communication network 106 may be a distributed communication network.

Various embodiments of the disclosure may provide a computer-readable medium, such as the non-transitory computer-readable medium 506, having stored thereon, computer-implemented instruction that when executed by the processor 504 causes the ecosystem 100 to establish a network of nodes and participants for dynamic management of media content rights. In accordance with an embodiment, the processor 504 causes the ecosystem 100 to execute operations to a configure the plurality of nodes 102a, . . . , 102z to interact with each other in accordance with a defined protocol in the communication network 106. The first node 102a of the plurality of nodes 102a, . . . , 102z associated with the first participant 108a may be configured to receive a request for playback of a media content from a content consumer, such as the first content consumer 110a, associated with a consumer device, such as the first consumer device 114a. The second node 102b of the plurality of nodes 102a, . . . , 102z may be associated with the second participant 108b, which owns the requested media content. The second participant 108b may be configured to provide media content rights associated with the requested media content to the first participant 108a and/or the content consumer, such as the first content consumer 110a. The first node 102a may be further configured to provide a media content metadata to the first consumer device 114a for consumption by the first consumer device 114a. A plurality of instances of the distributed media rights transaction ledger 104 may be associated with a respective node of the plurality of the nodes 102a, . . . , 102z. The media content metadata may be received from an instance of the plurality of instances of the distributed media rights transaction ledger. Each instance of the distributed media rights transaction ledger 104 may include a plurality of media content rights transactions corresponding to at least an acquisition of the media content rights by the first participant 108a and/or first content consumer 110a prior to the consumption of the media content at the first consumer device 114a. The plurality of media content rights transactions 112a, . . . , 112n may be categorized and defined based on the defined protocol. The plurality of media content rights transactions 112a, . . . 112n may be managed by the plurality of nodes 102a, . . . , 102z in accordance with the defined protocol in the communication network 106.

Managing the content rights of millions of media assets, by thousands of content owners, content distributors, and tracking a flow of content rights from one entity to other entity, in a secure manner is a herculean task. Currently, content rights clearance and negotiations are very time consuming, and backed by readily accessible/usable data. Further, multiple content libraries by various entities, require separate subscriptions and make it difficult for users to navigate to content of their choice freely without having individual subscription. Further, third party measurement of viewership of a content item, are costly. There is no mechanism to precisely track content rights and royalties for various entities. Further, isolated content catalogs and third-party dependencies to estimate viewership for a content item, such as a TV show, to plan for future advertisement inventory needs and obligations, increase complexities. This in turn increases re-work and requires installation of large infrastructures and resources to maintain uninterrupted content delivery for existing channel and limits the ability of the broadcast or network provider to change content, provide customized content in real time or near-real time. Existing systems have been largely ignored by the industry short of a basic "allow/reject" playback of media content.

The disclosed system and method for dynamic acquisition, re-distribution, enforcement, and tracking of content rights of media assets, has several advantages, for example, a) Providing tokenized and secure content licenses for a media asset; b) Ease-of-use and sharing of catalogs, revenue, content rights makes pirating unjustified; c) content distributors are able to dynamically acquire rights from content owners and pass on the rights to the consumers in real time or near real-time; d) instant user-targeted catalogs may be identified and prepared and pushed to apps, such as a mobile app or a TV app, at consumer devices; e) the ecosystem provides a platform for creation of a marketplace where new media markets, such as a content trading market may emerge; f) content development is user-driven/user-funded; g) digital currency, for example, digital crypto-currencies, may be used easily in network due to the inherent framework of network; h) enables instant settlements using the distributed media rights transaction ledger; and i) simplified, secured, real time, ensured, and fail-safe tracking of media content rights among various participants of the ecosystem.

The disclosed system and method, based on DRM-managed media licenses, may enforce much concise rules, that may include, but are not limited to, download ability, date range of playback, and frequency of media playback. Further, a media content rights transaction is issued to the node network (to be added to the distributed media rights transaction ledger) of the acceptance of the license request and consumption of the media content by content consumer, based on verification of the authenticity of the license request, and verification that media content rights exist on the distributed media transaction ledger for the content consumer to consume the media content. This may add additional layers of security to the ecosystem.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made, and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
   a plurality of nodes configured to interact with each other in accordance with a defined protocol in a communication network,
   wherein a first node of the plurality of nodes associated with a first participant is configured to receive a request for playback of a media content from a content consumer associated with a consumer device,
   wherein a second node of the plurality of nodes associated with a second participant, which owns the requested media content, is configured to provide media content rights associated with the requested media content to the first participant and/or the content consumer, and wherein the first node is further configured to provide a media content metadata to the consumer device for consumption by the consumer device; and a plurality of instances of a distributed media rights transaction ledger associated with a respective node of the plurality of the nodes, wherein the media content metadata is received from an instance of the plurality of instances of the distributed media rights transaction ledger, wherein each instance of the distributed media rights transaction ledger includes a plurality of media content rights transactions corresponding to at least an acquisition of the media content rights by the first participant and/or content consumer prior to the consumption of the media content at the consumer device, wherein the plurality of media content rights transactions are categorized and defined based on the defined protocol, wherein the plurality of media content rights transactions are managed by the plurality of nodes in accordance with the defined protocol in the communication network.

2. The system of claim 1, wherein the content consumer requests the first node of the plurality of nodes for the media content from a plurality of media content items, wherein the content consumer selects the media content from the plurality of media content items for consumption at the consumer device.

3. The system of claim 2, wherein the plurality of media content items includes first media content that the first participant and/or the content consumer has media content rights to, or second media content owned by the second participant associated with the second node, wherein the first participant associated with the first node does not have media content rights for redistribution of the second media content.

4. The system of claim 1, wherein the first participant associated with the first node is further configured to acquire the media content rights to redistribute to the content consumer based on negotiation with the second participant associated with the second node of the plurality of nodes, wherein the second participant has redistribution media content rights, in absence of the media content rights with the first participant or the content consumer.

5. The system of claim 1, wherein the first node is further configured to transmit the media content metadata to the consumer device, upon acquisition of the media content rights from the second participant for the consumption of the media content at the consumer device, and wherein the transmitted media content metadata comprises at least one or more constraints associated with the consumption of the media content, a location of a fourth node of the plurality of nodes that corresponds to a DRM license system integrated with the second participant associated with the second node, and metadata required to acquire a DRM-managed media license from the fourth node.

6. The system of claim 5, wherein the one or more constraints limit the consumer device to consume the media content, wherein the one or more constraints comprise at least date and time range restriction of the playback of the media content, a number of times the playback is allowed, a possibility to transfer playback rights to another participant, and downloading or offline playback restriction, and wherein the media content metadata comprises at least a first distributed ledger identifier that represents the media content, a second distributed ledger identifier of the first participant that facilitates the consumption of the media content, and a third distributed ledger identifier that represents the content consumer.

7. The system of claim 6, wherein the first participant that facilitates the consumption of the media content, is further configured to:

encrypt and hash the first distributed ledger identifier, the second distributed ledger identifier, and the third distributed ledger identifier; and create a cryptographic signature utilized to validate an origin of the request for the playback of the media content based on the encrypted and hashed first distributed ledger identifier, the second distributed ledger identifier, and the third distributed ledger identifier.

8. The system of claim 5, wherein the consumer device and/or the at least first node communicates a license request to the fourth node of the plurality of nodes that corresponds to a digital rights management (DRM) license system owned by the second participant with the metadata received from the first node, upon selection to consume the media content.

9. The system of claim 8, wherein, based on the receipt of the license request from the consumer device, the fourth node is configured to verify authenticity of the license request based on comparison of a signature of the license request from the first participant with one or more cryptographic keys, verify that the media content rights exist on the distributed media rights transaction ledger for the content consumer to consume the media content based on usage of an instance of the distributed media rights transaction ledger associated with the second node, issue a media content rights transaction to the communication network of an acceptance of the license request and consumption of the media content by the content consumer, and respond to the license request with the DRM-managed media license that enables the consumption of the media content.

10. The system of claim 9, wherein the fourth node is further configured to verify the existence of the media content rights on the distributed media rights transaction ledger for the content consumer by at least (1) traversal of a first plurality of records of media content rights that belong to the content consumer for a selected media content, (2) determination of a set of restrictions that exist for the playback of the media content, and (3) traversal of a second plurality of records of the first and/or the second participant that distributed the media content rights to the content consumer for consumption, and ensure that no restrictions exist for the content consumer to continue to consume the media content.

11. The system of claim 9, wherein the fourth node is further configured to issue the transaction to the communication network of the acceptance of the license request and consumption of the media content by the content consumer such that (1) a history of the consumption of the media content by the content consumer is recorded on the distributed media rights transaction ledger, (2) a history of the first participant who facilitated the consumption of the media content for the content consumer is recorded on the distributed media rights transaction ledger, and (3) an audit trail of consumption of the media content is recorded on the distributed media rights transaction ledger.

12. The system of claim 9, wherein the DRM-managed media license includes one or more constraints according to DRM of the media content in accordance with a set of restrictions of the media content rights of the content consumer to consume the media content.

13. The system of claim 9, wherein the consumer device receives the DRM-managed media license and executes the playback of the media content by use of DRM-managed media license in a specified manner consistent with the DRM of the media content.

14. The system of claim 1, wherein the communication network is a distributed communication network.

15. A method, comprising:
receiving, by a first node of a plurality of nodes associated with a first participant, a request for playback of a media content from a content consumer associated with a consumer device,
  wherein the plurality of nodes is configured to interact with each other in accordance with a defined protocol in a communication network, and
  wherein a plurality of instances of a distributed media rights transaction ledger is associated with a respective node of the plurality of nodes;
providing, by a second node of the plurality of nodes associated with a second participant which owns the requested media content, media content rights associated with the requested media content to the first participant and/or the content consumer; and
providing, by the first node, media content metadata to the consumer device for consumption by the consumer device in response to the media content rights provided by the second node,
  wherein the media content metadata is received from an instance of the plurality of instances of the distributed media rights transaction ledger;
  wherein each instance of the distributed media rights transaction ledger includes a plurality of media content rights transactions corresponding to at least an acquisition of the media content rights by the first participant and/or content consumer prior to the consumption of the media content at the consumer device, and
  wherein the plurality of media content rights transactions is categorized and defined based on the defined protocol, wherein the plurality of media content rights transactions is managed by the plurality of nodes in accordance with the defined protocol in the communication network.

16. The method of claim 15, further comprising requesting, by a content consumer, the first node of the plurality of nodes for the media content from a plurality of media content items,
  wherein the content consumer selects the media content from the plurality of media content items for consumption at the consumer device.

17. The method of claim 16, wherein the plurality of media content items includes first media content that the first participant and/or the content consumer has media content rights to, or second media content owned by the second participant associated with the second node, and
  wherein the first participant associated with the first node does not have media content rights for redistribution of the second media content.

18. The method of claim 15, further comprising acquiring, by the first participant associated with the first node, the media content rights to redistribute to the content consumer based on negotiation with the second participant associated with the second node of the plurality of nodes,
  wherein the second participant has redistribution media content rights, in absence of the media content rights with the first participant or the content consumer.

19. The method of claim 15, further comprising transmitting, by the first node, the media content metadata to the consumer device, upon acquisition of the media content rights from the second participant for the consumption of the media content at the consumer device, and
  wherein the transmitted media content metadata comprises at least one or more constraints associated with the consumption of the media content, a location of a fourth node of the plurality of nodes that corresponds to a DRM license system integrated with the second participant associated with the second node, and metadata required to acquire a DRM-managed media license from the fourth node.

20. The method of claim 19, wherein the one or more constraints limit the consumer device to consume the media content,
  wherein the one or more constraints comprise at least date and time range restriction of the playback of the media content, a number of times the playback is allowed, a possibility to transfer playback rights to another participant, and downloading or offline playback restriction, and
  wherein the media content metadata comprises at least a first distributed ledger identifier that represents the media content, a second distributed ledger identifier of the first participant that facilitates the consumption of the media content, and a third distributed ledger identifier that represents the content consumer.

21. The method of claim 20, further comprising:
encrypting and hashing, by the first participant, the first distributed ledger identifier, the second distributed ledger identifier, and the third distributed ledger identifier; and
creating, by the first participant, a cryptographic signature utilized to validate an origin of the request for the playback of the media content based on the encrypted and hashed first distributed ledger identifier, the second distributed ledger identifier, and the third distributed ledger identifier.

22. The method of claim 19, further comprising communicating, by the consumer device and/or the at least first node, a license request to the fourth node of the plurality of nodes that corresponds to a digital rights management (DRM) license system owned by the second participant with the metadata received from the first node, upon selection to consume the media content.

23. The method of claim 22, further comprising verifying by the fourth node, based on the receipt of the license request from the consumer device, authenticity of the license request based on comparison of a signature of the license request from the first participant with one or more cryptographic keys, verify that the media content rights exist on the distributed media rights transaction ledger for the content consumer to consume the media content based on usage of an instance of the distributed media rights transaction ledger associated with the second node, issue a media content rights transaction to the communication network of an acceptance of the license request and consumption of the media content by the content consumer, and respond to the license request with the DRM-managed media license that enables the consumption of the media content.

24. The method of claim 23, further comprising verifying, by the fourth node, the existence of the media content rights on the distributed media rights transaction ledger for the content consumer by at least (1) traversing a first plurality of records of media content rights that belong to the content consumer for a selected media content, (2) determining a set of restrictions that exist for the playback of the media content, and (3) traversing a second plurality of records of the first and/or the second participant that distributed the media content rights to the content consumer for consumption, and ensure that no restrictions exist for the content consumer to continue to consume the media content.

25. The method of claim 23, further comprising issuing, by the fourth node, the transaction to the communication network of the acceptance of the license request and consumption of the media content by the content consumer such that (1) a history of the consumption of the media content by the content consumer is recorded on the distributed media rights transaction ledger, (2) a history of the first participant who facilitated the consumption of the media content for the content consumer is recorded on the distributed media rights transaction ledger, and (3) an audit trail of consumption of the media content is recorded on the distributed media rights transaction ledger.

26. The method of claim 23, wherein the DRM-managed media license includes one or more constraints according to DRM of the media content in accordance with a set of restrictions of the media content rights of the content consumer to consume the media content.

27. The method of claim 23, further comprising:
receiving, by the consumer device, the DRM-managed media license; and
executing, by the consumer device, the playback of the media content by use of DRM-managed media license in a specified manner consistent with the DRM of the media content.

28. The method of claim 15, wherein the communication network is a distributed communication network.

29. A non-transitory computer-readable medium having stored thereon, computer implemented instruction that when executed by a processor in a computer, causes the computer to execute operations, the operations comprising:
in a communication network:
receiving, by a first node of a plurality of nodes associated with a first participant, a request for playback of a media content from a content consumer associated with a consumer device,
wherein the plurality of nodes is configured to interact with each other in accordance with a defined protocol in the communication network, and
wherein a plurality of instances of a distributed media rights transaction ledger is associated with a respective node of the plurality of the nodes;
providing, by a second node of the plurality of nodes associated with a second participant which owns the requested media content, media content rights associated with the requested media content to the first participant and/or the content consumer; and
providing, by the first node, media content metadata to the consumer device for consumption by the consumer device in response to the media content rights provided by the second node,
wherein the media content metadata is received from an instance of the plurality of instances of the distributed media rights transaction ledger;
wherein each instance of the distributed media rights transaction ledger includes a plurality of media content rights transactions corresponding to at least an acquisition of the media content rights by the first participant and/or content consumer prior to the consumption of the media content at the consumer device, and
wherein the plurality of media content rights transactions is categorized and defined based on the defined protocol, wherein the plurality of media content rights transactions is managed by the plurality of nodes in accordance with the defined protocol in the communication network.

* * * * *